(12) United States Patent
Ehle et al.

(10) Patent No.: US 11,629,807 B1
(45) Date of Patent: Apr. 18, 2023

(54) DRAINAGE TILE INSPECTION SYSTEM

(71) Applicant: Davaus, LLC, Hoagland, IN (US)

(72) Inventors: Austin Ehle, Fort Wayne, IN (US);
David J. Hockemeyer, Hoagland, IN (US)

(73) Assignee: Davaus, LLC, Hoagland, IN (US)

( * ) Notice: Subject to any disclaimer, the term of this patent is extended or adjusted under 35 U.S.C. 154(b) by 383 days.

(21) Appl. No.: 16/788,753

(22) Filed: Feb. 12, 2020

Related U.S. Application Data

(60) Provisional application No. 62/804,380, filed on Feb. 12, 2019.

(51) Int. Cl.
*F16L 55/40* (2006.01)
*G01M 3/00* (2006.01)
*F16L 101/30* (2006.01)

(52) U.S. Cl.
CPC .......... *F16L 55/40* (2013.01); *G01M 3/005* (2013.01); *F16L 2101/30* (2013.01)

(58) Field of Classification Search
CPC ...... F16L 55/40; F16L 2101/30; G01M 3/005
See application file for complete search history.

(56) References Cited

U.S. PATENT DOCUMENTS

| | | | |
|---|---|---|---|
| 1,976,990 A | 10/1934 | Guthrie | |
| 2,727,722 A | 12/1955 | Conboy | |
| 4,621,532 A | 11/1986 | Takagi | |
| 4,770,105 A | 9/1988 | Takagi | |
| 4,782,786 A | 11/1988 | Himmler | |
| 5,150,056 A | 9/1992 | Wilcock | |
| 5,172,639 A | 12/1992 | Wiesman | |
| 6,243,657 B1 | 6/2001 | Tuck | |
| 6,427,602 B1* | 8/2002 | Hovis | F16L 55/34 |
| | | | 104/138.1 |
| 6,768,959 B2 | 7/2004 | Ignagni | |
| 6,853,200 B2 | 2/2005 | Munser | |
| 7,131,344 B2 | 11/2006 | Tarumi | |
| 7,210,364 B2 | 5/2007 | Ghorbel | |
| 7,726,256 B1* | 6/2010 | Weisenberg | F16L 55/40 |
| | | | 118/712 |
| 8,098,063 B2 | 1/2012 | Paulson | |

(Continued)

FOREIGN PATENT DOCUMENTS

| | | | | |
|---|---|---|---|---|
| CN | 204083660 U | | 1/2015 | |
| CN | 105728412 A | * | 7/2016 | ............... B08B 9/20 |

(Continued)

OTHER PUBLICATIONS

PatBase Machine translation of CN204083660U on Jan. 8, 2015 (pp. 10).

(Continued)

*Primary Examiner* — Herbert K Roberts
*Assistant Examiner* — Anthony W Megna Fuentes
(74) *Attorney, Agent, or Firm* — Woodard, Emhardt, Henry, Reeves & Wagner, LLP

(57) ABSTRACT

A remote inspection system for inspecting piping that includes: a vehicle configured to move through pipe; a lighting system mounted on the vehicle; a sensor mounted on the vehicle; a communication system on the vehicle; and a processor configured to assess an effective drainage coefficient of the inspected piping based on data gathered from the sensor.

17 Claims, 22 Drawing Sheets

(56) References Cited

U.S. PATENT DOCUMENTS

| | | |
|---|---|---|
| 8,468,968 B2 | 6/2013 | Weisenberg |
| 9,599,272 B2 | 3/2017 | Hartog |
| 9,739,792 B2 | 3/2017 | Atwood |
| 9,731,334 B2 | 8/2017 | Ervin |
| 10,022,643 B2 | 7/2018 | Bernstein |
| 2010/0253475 A1 | 10/2010 | Rosen |
| 2014/0216836 A1* | 8/2014 | Davies .................. B62D 55/06 180/164 |

FOREIGN PATENT DOCUMENTS

| | | |
|---|---|---|
| DE | 4114601 A1 | 4/1992 |
| DE | 19527316 A1 | 2/1997 |
| DE | 10118217 A1 | 10/2002 |
| KR | 100936484 B1 | 1/2010 |
| KR | 101223184 B1 | 1/2013 |
| KR | 20170013001 A * | 2/2017 |
| KR | 101740514 B1 | 6/2017 |
| WO | WO 95/03526 | 2/1995 |
| WO | WO 00/16002 | 3/2000 |
| WO | WO 2017/085126 A1 | 5/2017 |

OTHER PUBLICATIONS

PatBase Machine Translation of DE10118217A1 on Oct. 18, 2018 (pp. 19).
PatBase Machine Translation of DE19527316A1 on Oct. 18, 2018 (pp. 32).
PatBase Machine Translation of DE4114601A1 on Oct. 19, 2018 p(p. 23).
PatBase Machine translation of KR100936484B1 on Feb. 14, 2018 (pp. 19).
PatBase Machine translation of KR101223184B1 on Apr. 24, 2013 (pp. 24).
PatBase Machine translation of KR101740514B1 on Jun. 9, 2017 (pp. 43).

* cited by examiner

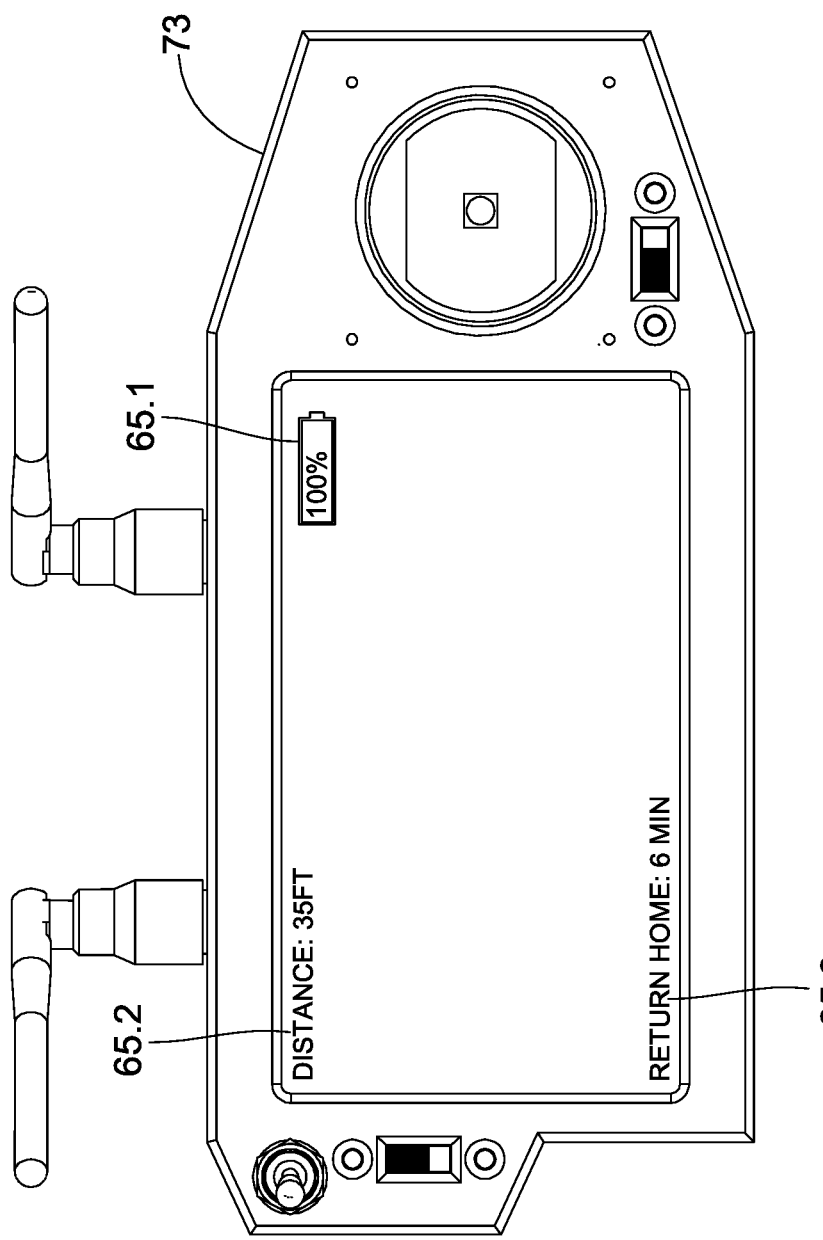

DRAINAGE TILE INSPECTION SYSTEM

CROSS-REFERENCE TO RELATED APPLICATIONS

This application claims the benefit of U.S. Provisional Application No. 62/804,380, filed Feb. 12, 2019, which is hereby incorporated by reference.

BACKGROUND

This disclosure is in the field of remote inspection.

The US has approximately 180 million acres of farm land involved with the production of corn and beans alone. The systematic tiling of farm fields began approximately in the 1870's. At that time the tile systems were installed by digging the trenches by hand and placing clay cylinders that were open on each end and hollow in end to end to create pathways for excess water to drain from the soil profile, i.e., clay tile. The tile are commonly placed at depths of 20-24 inches beneath the surface. The diameters of these tile pathways or laterals are often 4" in diameter and spaced up to 60' apart in the older systems. More modern tile laterals are spaced as closely as 15' apart depending on the soil type and land topography. The smaller lateral tiles flow into tile lines of larger diameters called mains. These mains then flow to an outlet, which can be a man-made ditch or natural waterway. As a wholly defined network of tile the system is then referred to as a "drainage system".

These aging drainage systems can be in various states of disrepair, and often times operating with a significant degradation in performance. Even modern drainage systems are subject to a performance loss over time. Currently systems do not exist to sufficiently determine the operating health of a drainage system or to proactively diagnose a failing component of drainage system. Tile can fail by collapsing completely or by silting in, filing in with fine soil which reduces the effective diameter of the tile and thus the tile's ability to remove water from the soil profile.

The management of water is second only to sunlight as the most important resource for high yielding crops

BRIEF DESCRIPTION OF THE DRAWINGS

FIG. 28 is a top view of the FIG. 22 remote control.

DESCRIPTION OF THE ILLUSTRATED EMBODIMENTS

Figure 1:
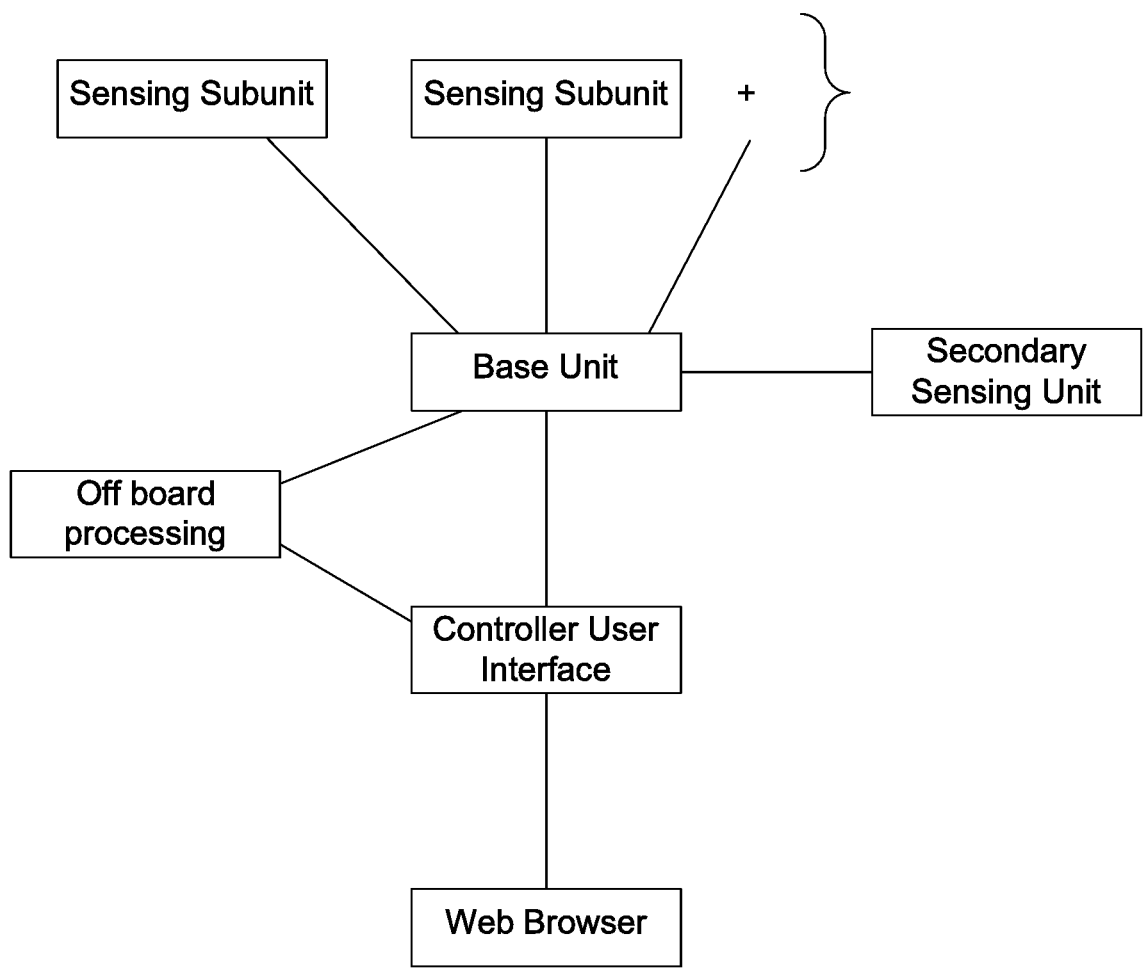
FIG. 1 is a schematic diagram of an overall system.

For the purposes of promoting an understanding of the principles of what is claimed, reference will now be made to embodiments illustrated in the drawings and specific language will be used to describe the same. It will nevertheless be understood that no limitation of the scope of the claims is thereby intended. Any alterations and further modifications in the illustrated device, and any further applications of the principles disclosed and illustrated herein are contemplated as would normally occur to one skilled in the art to which the disclosure relates.

With respect to the specification and claims, it should be noted that the singular forms "a", "an", "the", and the like include plural references unless expressly discussed otherwise. As an illustration, references to "a device" or "the device" include one or more of such devices and equivalents thereof. It also should be noted that directional terms, such as "up", "down", "top", "bottom", and the like, are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

Aging and/or poorly installed tiling systems can have inconsistencies in their slope resulting in inconsistent drainage through the system. The technology disclosed herein can also be used to provide "as-is" maps for a currently installed system. Such maps can then be used to plan new tile drainage systems to accurately augment, repair or replace an existing system.

The disclosed system is configured to scan existing tiling systems, then determining the system's health. It should be noted that the disclosed system is not limited to agricultural drainage systems. Any system involving a network of closed piping, where the piping or pathways are not readily accessible would benefit from this technology.

The disclosed system is configured to address the following issues:
- Quantify tile silting
- Quantify tile breakdown
- Quantify tile cracking and near breakdown tile
- Quantify roots in the tile
- Quantify slope and low spots in a tile system
- Creation of tile maps, including size, material type and referenced tile location(s)
- Assess soil health, including, but not limited to bulk density, porosity, compaction and agronomic properties
- Determine an "effective drainage coefficient" (EDC) for the tile system
  - Categorize a tile system as "red/yellow/green"
    - Geo-reference the tile system with tile color category, slope of tile, and identification of high and low spots in the tile system
- Determine possible remedies based on acquired data
- Combine acquired data with other data pertinent to crop production Features that the disclosed system can optionally include:
- A locator feature so that the sensing unit can be found and manually removed from a tile system if the sensing unit becomes stuck
- Edge detection and warning system as part of the sensing system to determine when there are obstacles such as offset tiles that would prevent the sensing unit from reversing direction
- A self-righting mechanism to correct the orientation of the sensing unit in the event that it tips over
- An all direction drive system that operates regardless of the orientation of the sensing unit
- A means to clean sensor receptors, including, but not limited to camera lenses
- Include a limp home mode that triggers on low battery that operates systems on a stepped down voltage to preserve battery life
- Include a failsafe broadcast of location information on low battery while shutting down all other systems
- Include RFID technology that can be used to locate the sensing unit in the event of a complete battery failure
- The sensing unit can include a compass
- The sensing unit can include a gyroscope and track relative orientation to the horizon.
  - gyroscope information can be used to correct the orientation of sensor data such as an orientation of images from a camera
- The sensing unit is preferably water proof
- The size of the sensing unit can preferably be less than internal size of the tile to account for silted and/or damaged tiles
- The sensing unit is preferably configured to traverse through corrugated tile
- The sensing unit is preferably configured to traverse across step elevation changes between adjacent tiles
- The sensing unit may include a lighting system that is continuously variable to help account for varying inspection conditions. For example, tile cracks may be observed more easily when swept with a range of light intensities
- The sensors on the sensing unit can be capable of movement relative to the sensing unit such as tilt, pan and rotation to maximize the ability to inspect tile
- A removable battery with capacity for battery change for extended inspection
- The user interface can include feedback of battery status including estimated battery time remaining
- The user interface can generate and display a map with the location of the sensing unit and the point of entry
- The user interface can calculate an estimated return time and notify the user when it is time to return to the point of entry
- Use P polarized antennas
- Antenna can optionally be incorporated directly into the structure of the sensing unit, such as in a cover
- Additional relay vehicles can be used in the tile system to account for difficulties in transmitting through the earth
- A larger "base station" could be used with a smaller sensing unit to recharge the sensing unit within the tile system The drive system can include multiple groupings of either tires or tracks such that the vehicle system can transverse many conditions including water, silt and wide corrugations. The drive system can also be able to navigate step changes in elevation and flipping or turning over in the tile system. It is also useful if the vehicle includes for righting itself or have a drive system that has no right side up and can drive in any orientation. In addition, applicable water proofing standards can be met. It could also be conducive to add a propeller or jet system to add propulsion to the system in conditions with large amounts of water. The jet system could also be utilized to clear silt.

The unit could alternatively include a base unit with smaller sub units that contain all or some of the sensor arrays. The base unit could communicate with the sub until and relay information to the user, allowing for high powered systems to transmit through the soil. The base unit could also provide a charging station and could also be a source for downloading information. Wireless charging and communications would be an applicable technology for this use case. An external power source could be utilized for the base station to charge the smaller scanning units, thus providing extended or infinite operation time to the scanning units for extended operational times. Solar charging could also be implemented where the power grid is not accessible.

Additionally it may be beneficial to add a trailing surface device for communication to the base station/user due to the difficulty of transmitting through large cross sections of soil. The trailing device can be either ground based or air based, it can also include a complimentary set of sensors to expand the data being collected.

A locator system can also be included in the system to address the eventuality that at some point the unit will be stranded in the tile system. In addition, the rare case could occur that a nearly vertical tile branches from the tile being traversed by the unit, in which the unit could fall into and become trapped. In this case edge detection would be a useful feature to include.

The cameras and sensors will likely be exposed to various elemental conditions including water and silt, causing occluded or degraded performance. A system with brushes or other means of cleaning the sensors can be included. The cameras and appropriate sensors can be either omnidirectional or mounted to a mechanism that allows the user to manipulate them according to environmental conditions, i.e., driving sideways or in reverse. Additionally the environment lighting can be variable to allow the user or analysis tools to discern small cracks or features in the tile structure.

Additional sensor technologies can be employed to gather soil health metrics, including but not limited to density/compaction layers, soil bulk density, porosity, etc.

A power management system can be included to help address the unit running out of power while within a tile system. An example power management system could include: 1) a limp home mode which limits power to only those systems needed for moving back to an entry point, possibly at a lower voltage setting; 2) a power locating signal mode wherein drive systems are powered down and the unit broadcasts a power locating signal; 3) an RFID passive location system for locating the system upon complete power failure.

Remote data transmission can occur a variety of ways. Either directly to the user from the sensing unit to the display/controller. From the sensing unit to the base unit, located within the tile, then back to the display/controller. Or the system can include an above ground sensing unit that is surface or air based. Care should be taken to design the system so the correct polarization is utilized. Testing has proven theory that the P polarization of waves travels more effectively through the soil profile than S polarized waves.

The system can include algorithms developed for determining the slope in a tile without access to GPS. Data can be analyzed to calculate and display red, yellow, green relative drainage performance along with "as designed" drainage coefficients to show optimal system performance. Multiple factors can contribute to reducing drainage performance including: Silting or tile occlusion, improper slope and completely blocked tiles. The indications will also be quantitative, such that the data will be actionable to provide guidance to the user to make cost effective management decisions.

Structural analysis will also be a part of the tools available to the user to indicate a weak spot in the tile structure and if there is failure imminent.

Geo referenced tile maps can be created from the information gleaned from sensors.

The user interface will provide controls for the sensing units and any other units employed in the system, including but not limited to subunits and base stations or ground and air based relay/sensing stations.

The user interface can indicate a horizon relative to the orientation of the vehicle to alert user of the horizontal plane for navigation within the tile system to help avoid overturning. A compass can also be included in the display to assist with navigation, along with a "breadcrumb" style of mapping system to return home, marked with a "you are here" and a start point. The video display can also be processed for vibration and tilt to show a high quality image feed to the user.

The display can also indicate the battery percentage and time remaining. As well as indicate the "return home time" and applicable warnings.

Figure 2:
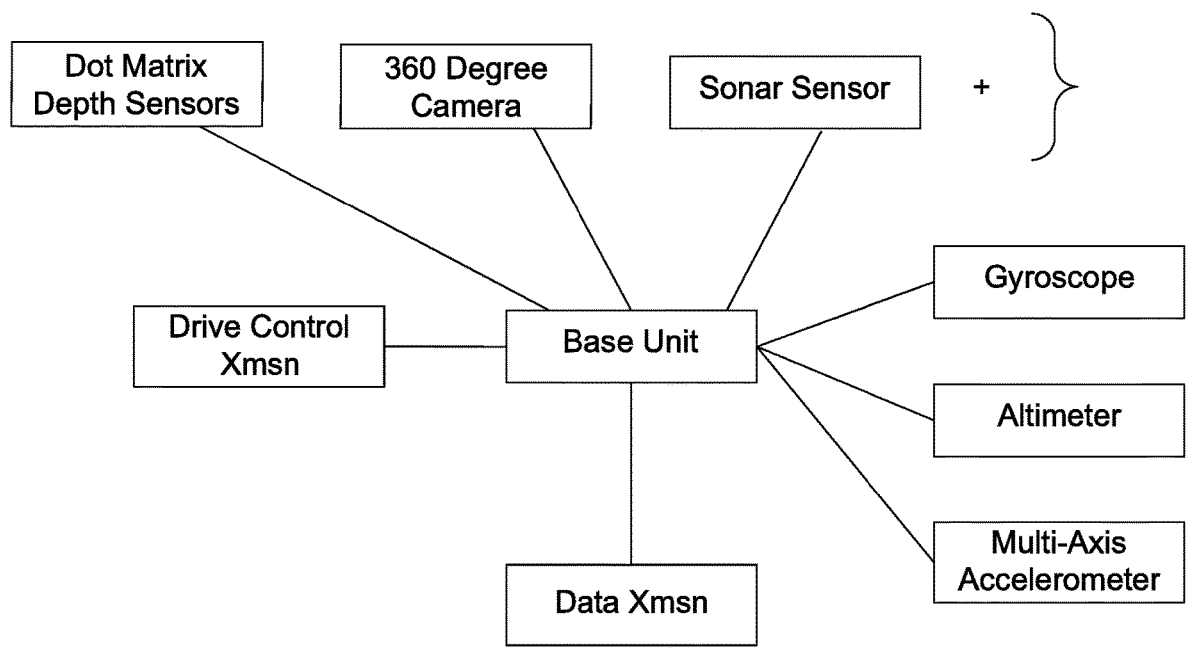
FIG. 2 is a schematic diagram of a sensing unit, an element of the overall system in FIG. 1.
Figure 3:
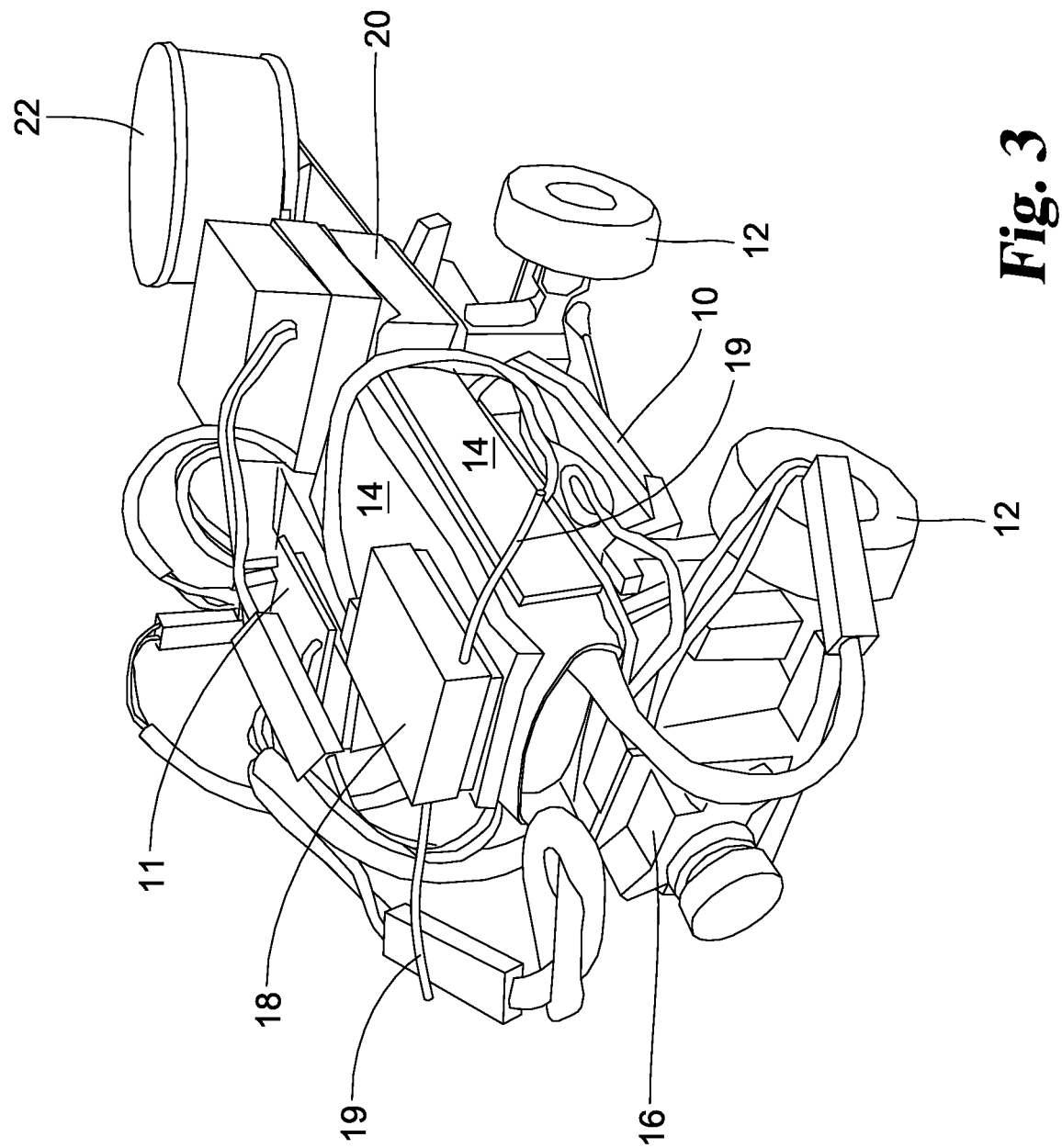
FIG. 3 is a drawing of a perspective photograph of a prototype tile sensing unit.
Figure 4:
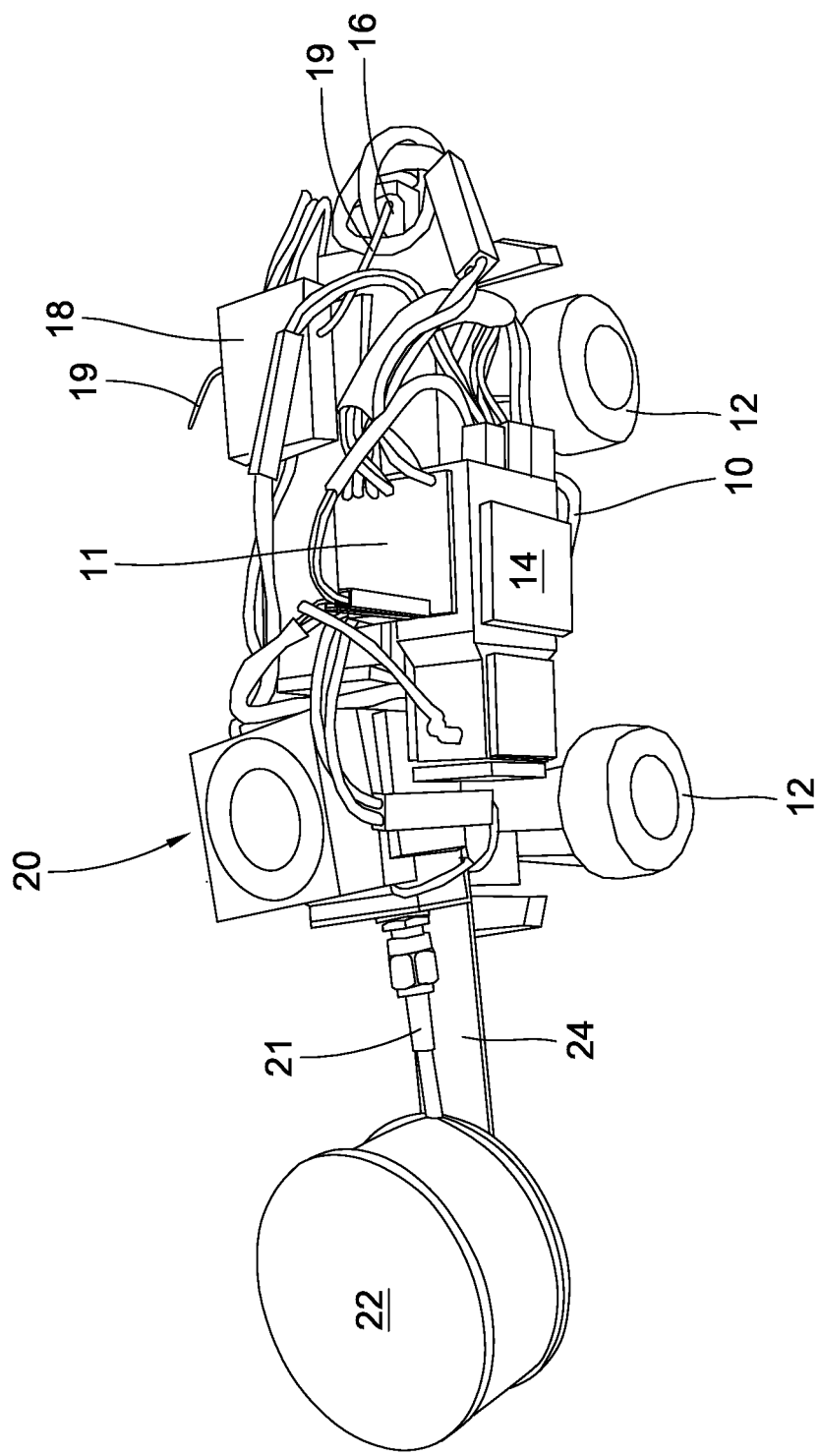
FIG. 4 is a drawing of a perspective photograph of the FIG. 3 prototype tile sensing unit.
Figure 5:
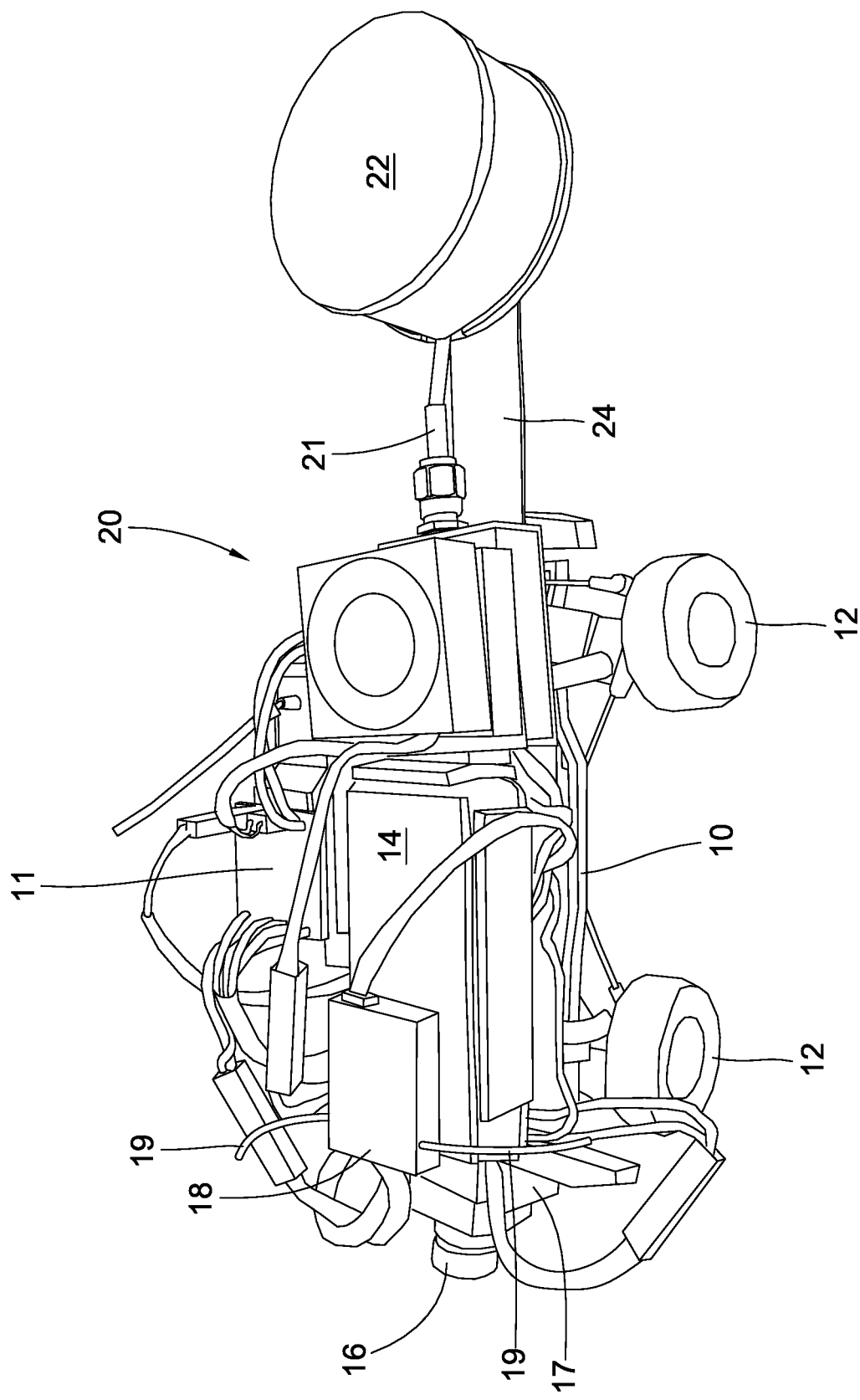
FIG. 5 is a drawing of a perspective photograph of the FIG. 3 prototype tile sensing unit.
Figure 6:
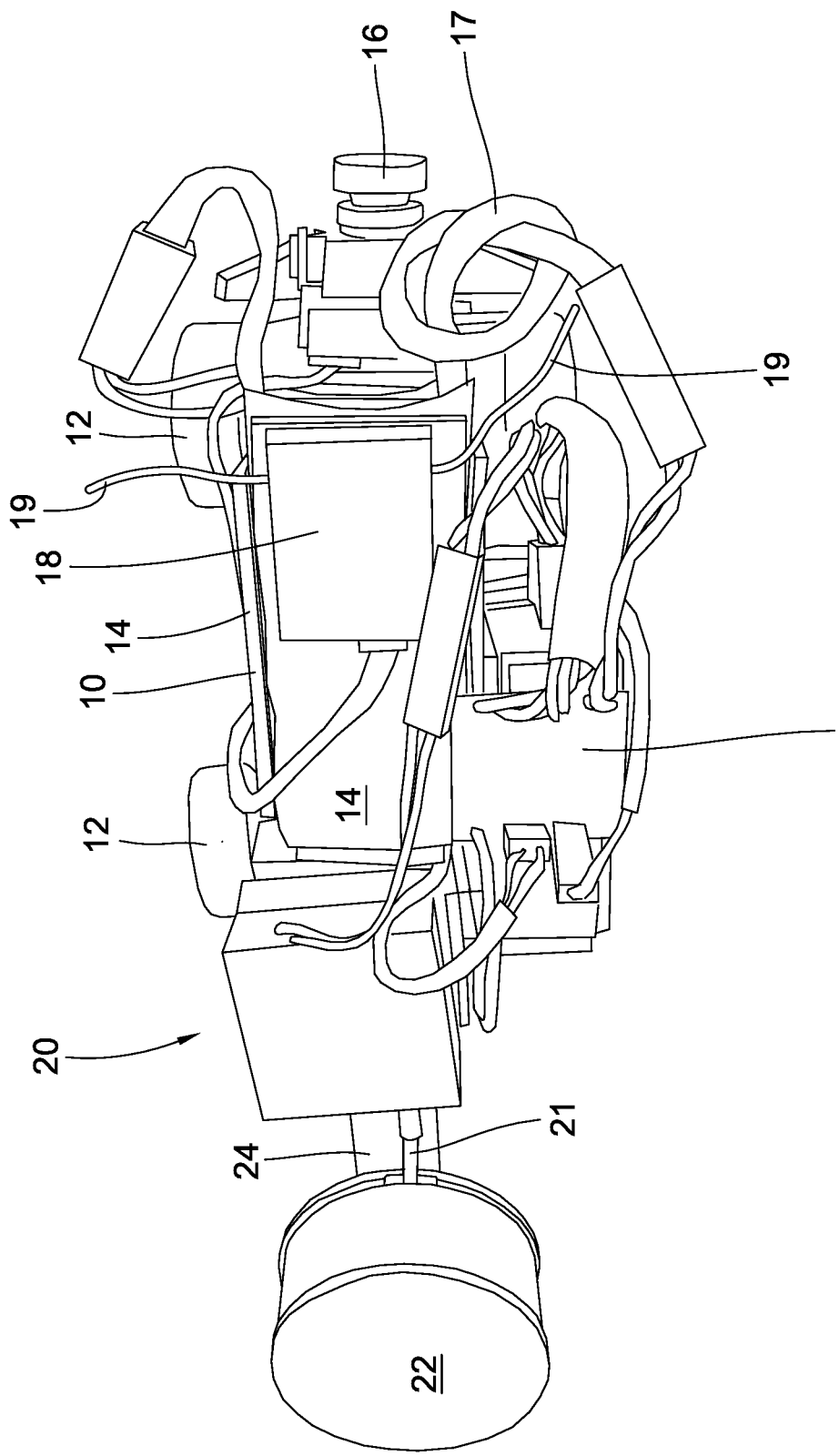
FIG. 6 is a drawing of a perspective photograph of the FIG. 3 prototype tile sensing unit.
Figure 7:
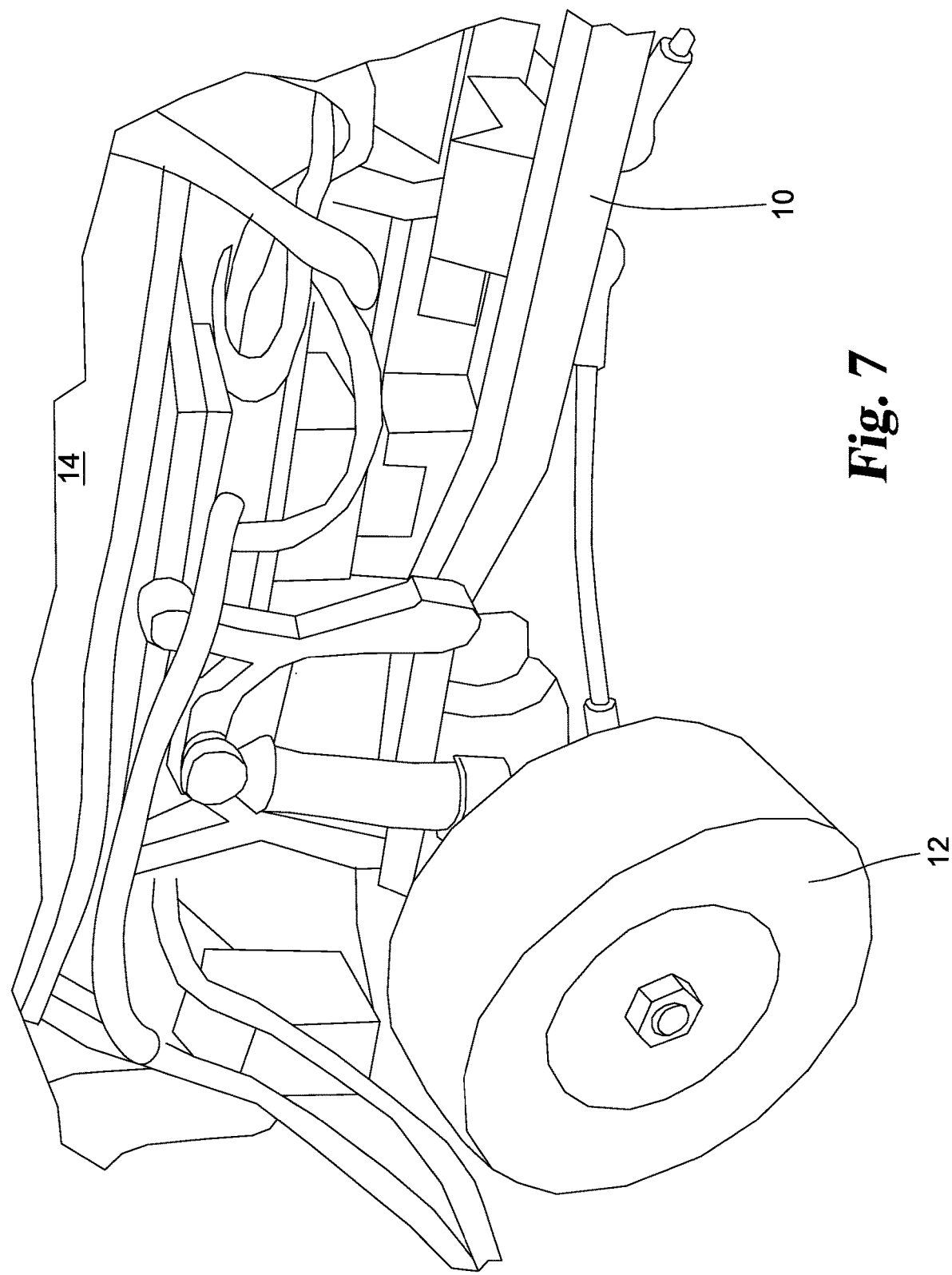
FIG. 7 is a drawing of a perspective photograph of a portion of the FIG. 3 prototype tile sensing unit.

Referring to FIG. 1, a schematic diagram of an overall system for drainage tile inspection is shown. Referring to FIG. 2, a schematic diagram of a sensing unit, a component of the overall system illustrated in FIG. 1, is shown.

Referring to FIGS. 3-7, photographs of a prototype sensing unit are shown. The prototype sensing unit includes a remote control vehicle 10 that includes controller 11, 4 wheels 12, battery 13 and attachment means 14 for removable attaching components to remote control vehicle 10. Controller 11 converts control signals from receiver 18 into signals which are usable by motors and LEDs E for mobility and illumination. Battery 13 stores energy to power vehicle 10 and the sub components attached to vehicle 10. Remote control vehicle includes camera 16, receiver 18 and transmitter 20, each attached to remote control vehicle 10 by attachment means 14. In the illustrated prototype, attachment means 14 are hook and loop pads that are adhered to remote control vehicle 10 and camera 16, LEDs 17, receiver 18 and transmitter 20 such that camera 16, LEDs 17, receiver 18 and processor 20 are removably coupled to remote control vehicle 10. Receiver 18 is a radio receiver with a vertically polarized antenna which receives and decodes control signals from control 30. Receiver 18 outputs signals to controller 11 governing mobility (steering and translational movement) and illumination (via LEDs 17). Receiver 18 includes antenna 19 which is a horizontally polarized antenna for receiving control signals. Transmitter 20 is a radio transmitter that encodes a video signal from the camera 16 and outputs a radio frequency signal to antenna 22 through cable 21. Transmitter 20 includes a heatsink and a fan to remove excess thermal energy from transmitter 20.

Remote control vehicle also includes antenna 22 mounted on boom 24 that is coupled to remote control vehicle 10. Antenna 22 emits radio frequency power delivered by a transmitter 20. In the photographed embodiment, antenna 22 is a video transmission antenna that emits circularly-polarized radio waves. Boom 24 mechanically supports antenna 22 to reduce tension in the cable 21 connecting transmitter 20 and antenna 22.

Figure 8:
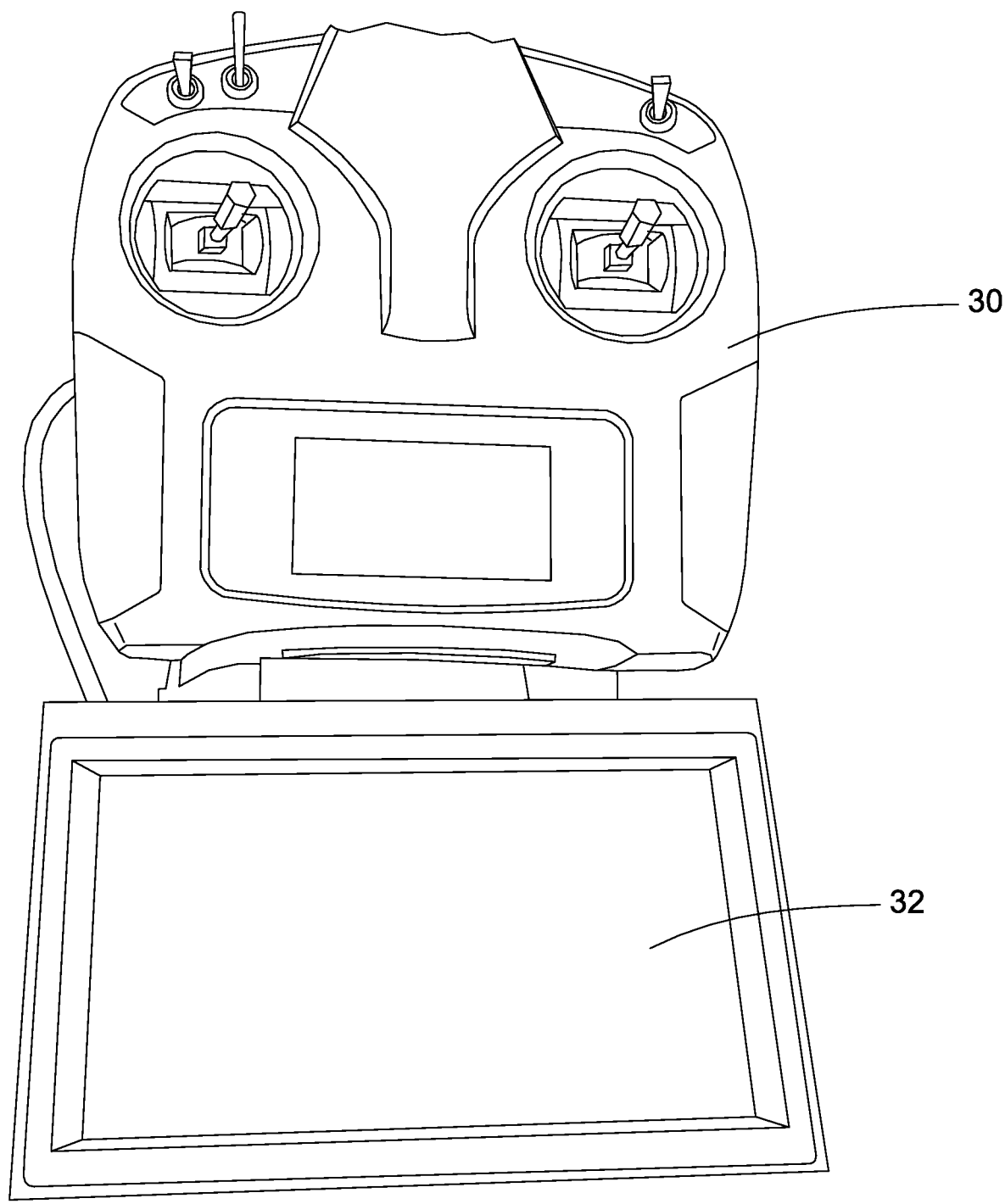
FIG. 8 is a drawing of a perspective photograph of a remote control for the FIG. 3 prototype tile sensing unit.
Figure 9:
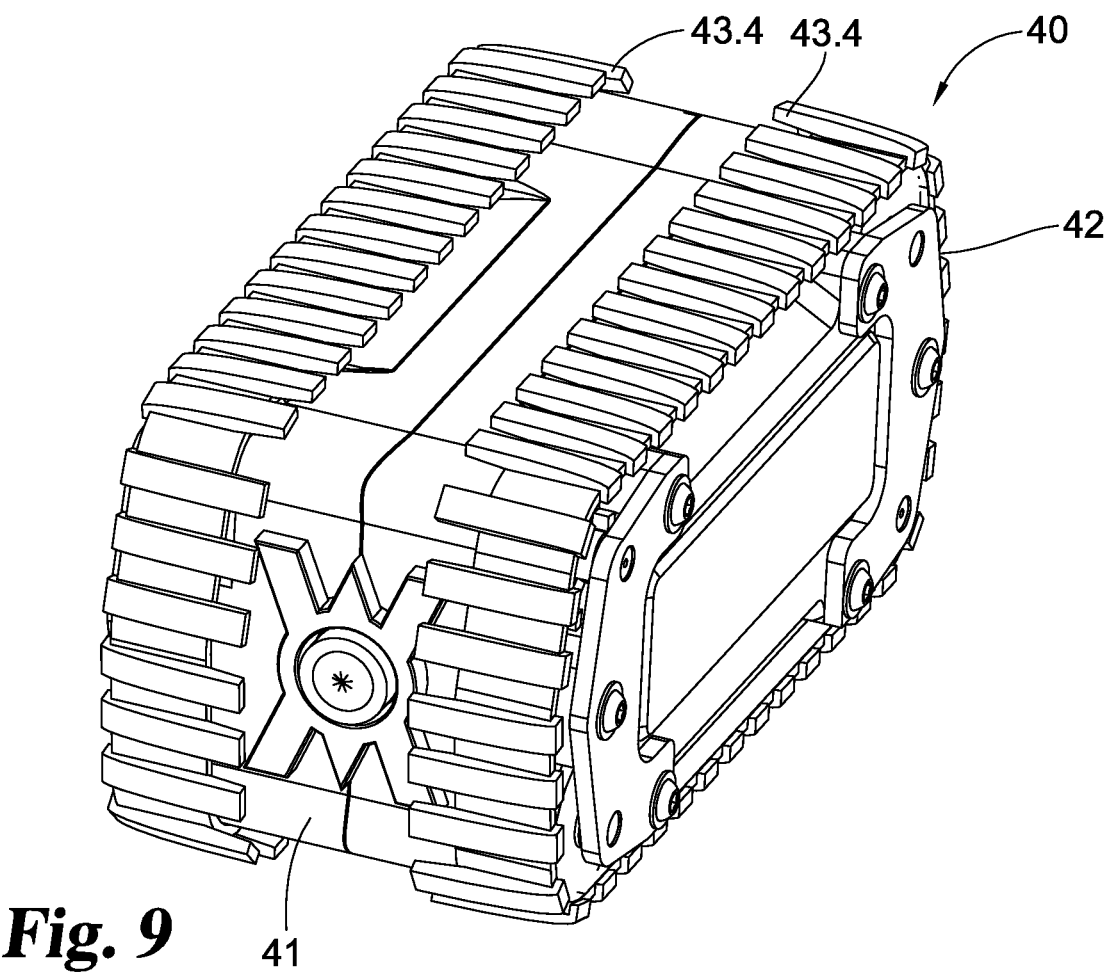
FIG. 9 is a perspective view of a tracked embodiment of a tile sensing unit.

Referring to FIG. 8, control 30 is shown with display 32. Control 30 is a control unit an transmitter which communicates wirelessly with vehicle 10 and includes the controls for an operator to control vehicle 10 remotely. Display 32 is configured to display the image captured by camera 16 to inspect the surroundings of vehicle 10. Display 32 may also be configured to display additional information as desired.

Referring to FIGS. 9-21, a remote sensor for inspection of agricultural drainage tile systems, specifically rover 40, is illustrated.

Rover 40 generally includes tracks 43, cover 44, light source 45, light bezel 46, electronic speed controller 47, driven wheels 48, idler wheels 49, body pieces 50 and 51, sensor 52, motor 53, receiver 54, transmitter 55, battery 56, axle support 57 and camera switcher module 58. Body pieces 50 and 51 may be constructed of a rugged lightweight material which is nonconductive and UV resistant. Axle supports 57 may optionally be constructed to act as thermally conductive surfaces to emit heat from internal components. Body pieces 50 and 51 have various features designed into the internal structure for retention of components. Body component 50 has a compartment configured to house the battery 56 and includes a battery cover door 44.

The drive system in rover 40 is a track system that includes two motors 53 mounted in each of body component 50 and 51 that drive a track 43 on each body component 50 and 51. Motors 53 are each coupled to drive wheels 48 that each individually engage track 43. Motors 53 are bi-directional. Each track 43 is directed by a number of idler wheels 49 that maintain the length of track 43 and guide track 43 between the spaced apart drive wheels 48.

Figure 19:
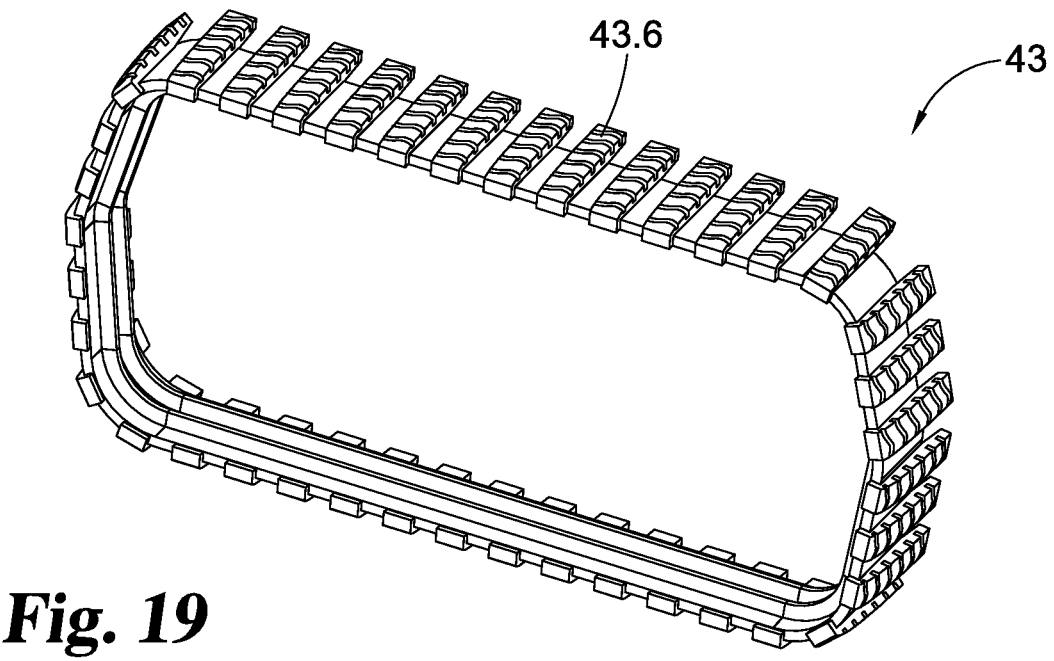
FIG. 19 is a perspective view of an alternative embodiment of the FIG. 18 track.

Track 43 includes belt 43.1 and a multitude of tread segments 43.2 spaced apart by spacing 43.3. Tread segments 43.2 are mounted on belt 43.1 such that offset tread 43.4 extends further away from belt 43.1 compared to short side 43.5. As shown in FIG. 19, track 43 may optionally include a track pattern 43.6 on individual tread segments 43.2 to better grip slick surfaces.

FIGS. 9-12 illustrate a first installation of track 43 with offset treads 43.4 extending inwardly toward each other. FIGS. 13-16 illustrate a second installation of track 43 with offset treads 43.4 extending outwardly away from each other. Thus, changing the orientation of track 43 allows variation in the effective width of rover 40.

Figure 10:
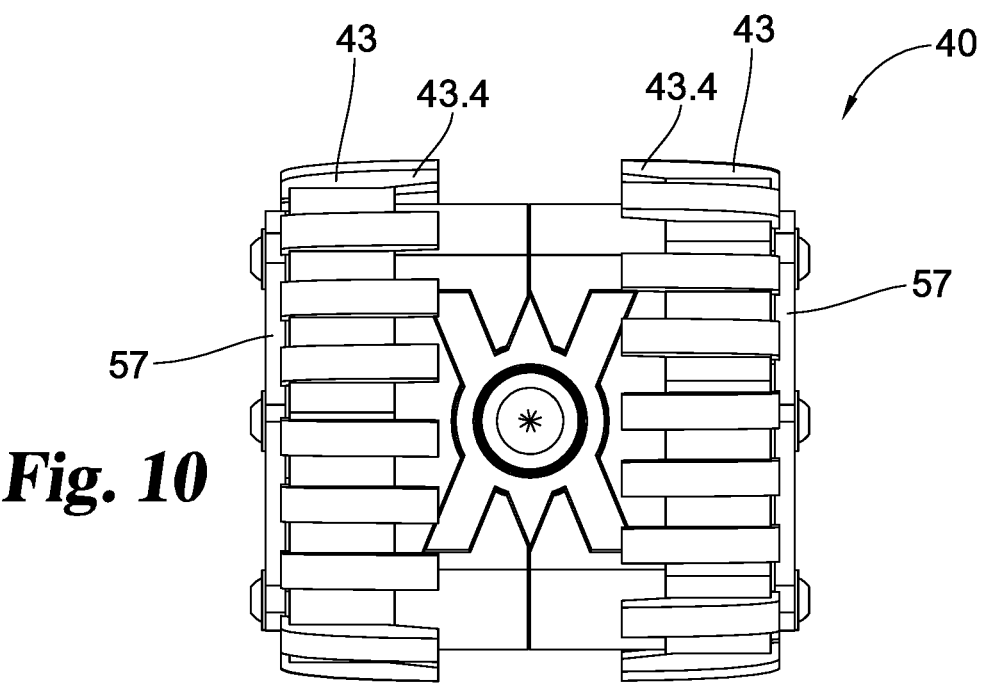
FIG. 10 is a front view of the FIG. 9 title sensing unit.
Figure 11:
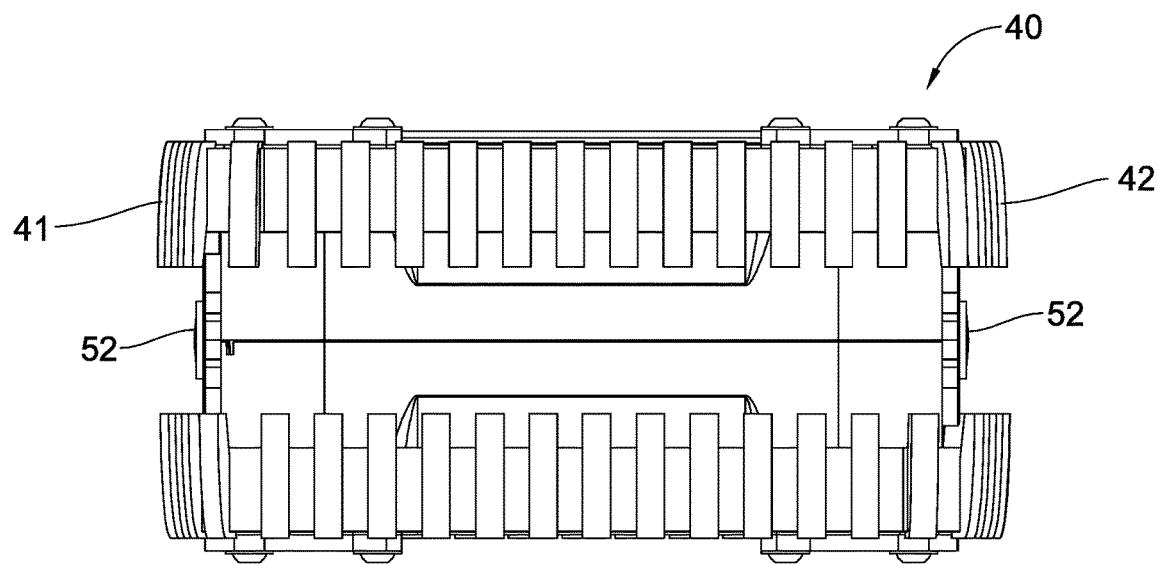
FIG. 11 is a top view of the FIG. 9 title sensing unit.
Figure 12:
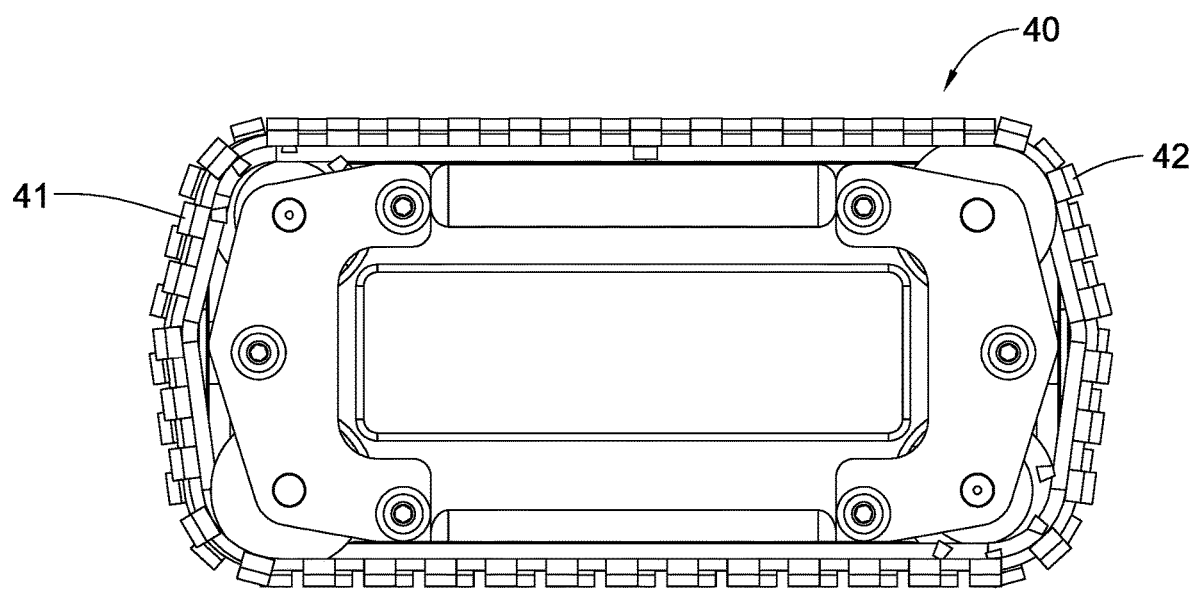
FIG. 12 is a right side view of the FIG. 9 title sensing unit.
Figure 13:
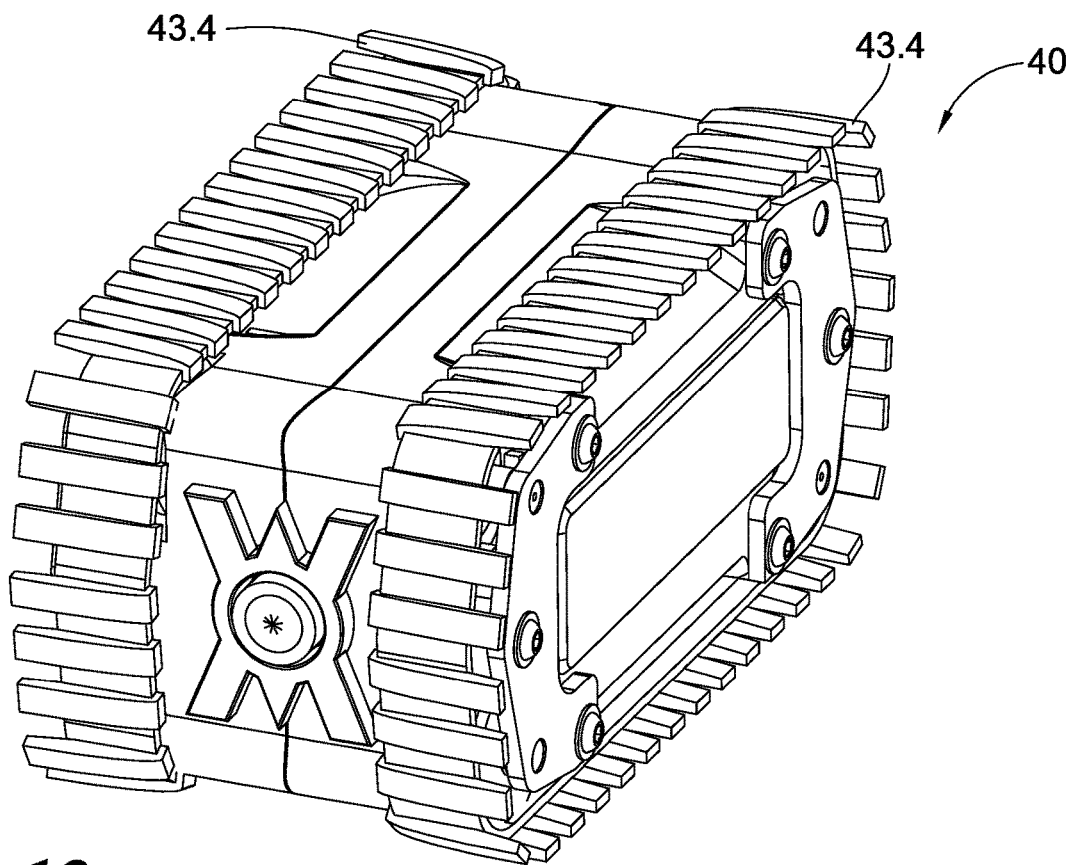
FIG. 13 is a perspective view of an alternative embodiment of the FIG. 9 tile sensing unit with the tracks in an alternative position.
Figure 14:
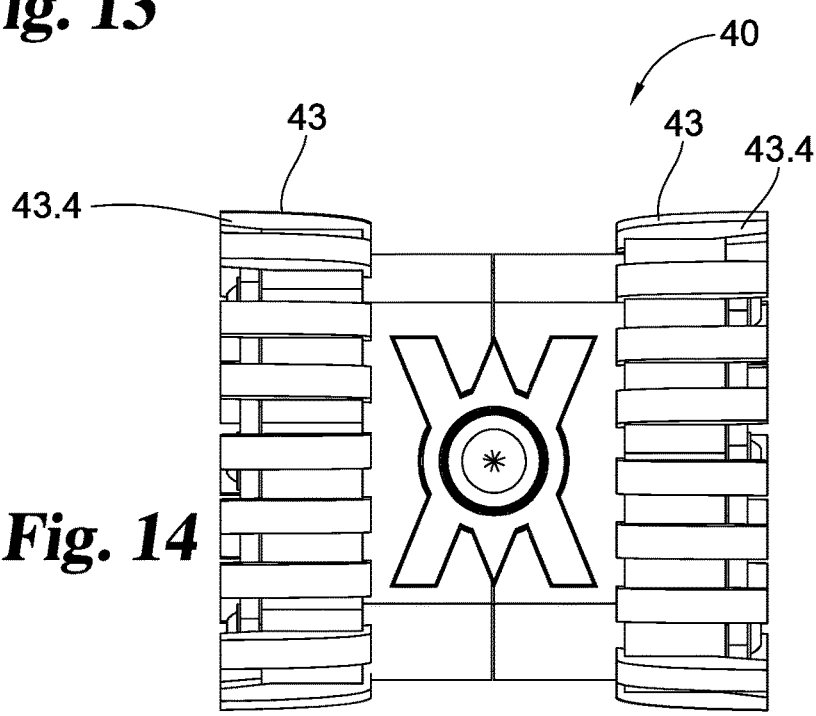
FIG. 14 is a front view of the FIG. 13 title sensing unit.
Figure 15:
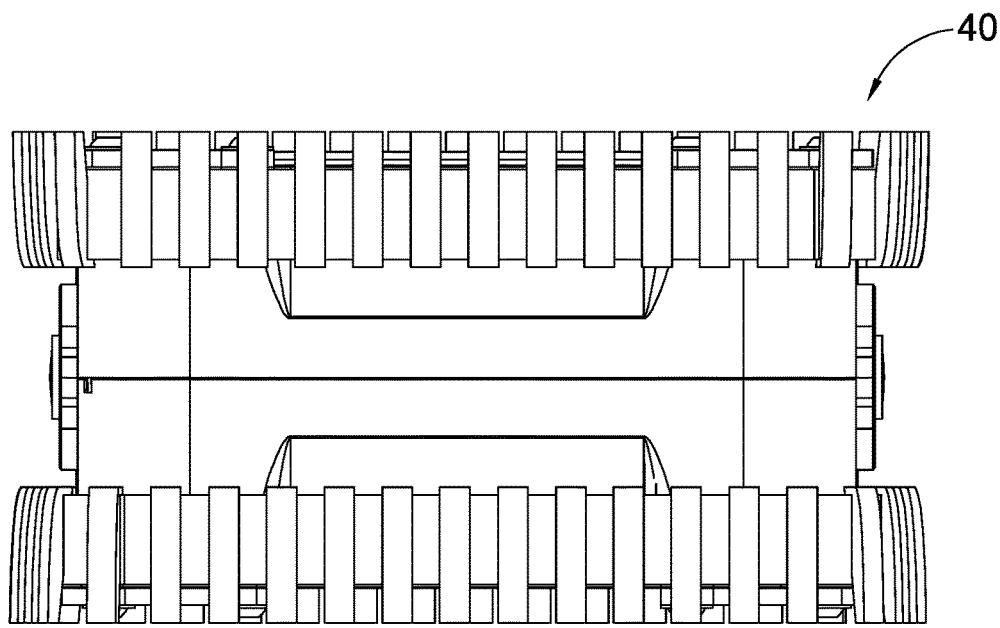
FIG. 15 is a top view of the FIG. 13 title sensing unit.
Figure 16:
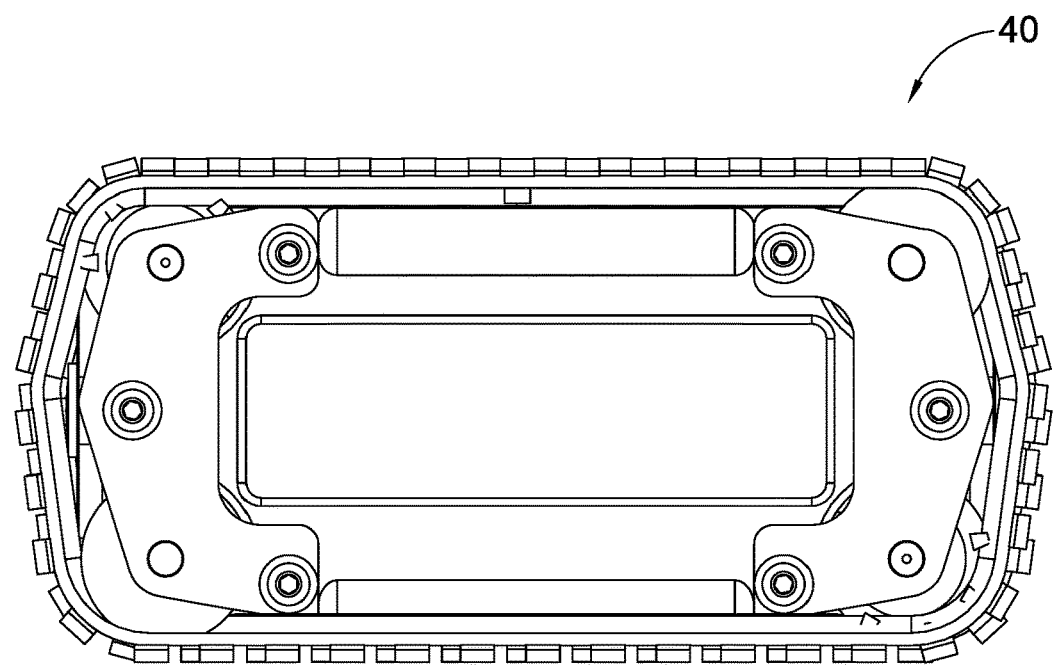
FIG. 16 is a right side view of the FIG. 13 title sensing unit.

In either configuration, track 43 extends above and below all other componets of rover 40 (in the orientation of rover 40 shown in FIGS. 10 and 14). In addition, in the configuration shown in FIGS. 13-16, offset treads 43.4 also extend horizontally beyond all of the components of rover 40. This configuration may improve the ability of rover 40 to right itself within a tile, as in any orientation of rover 40, at least some portion of at least one of tracks 43 will be in contact with the tile. Conversely, in the configuration shown in FIGS. 9-12, as least some portions of rover 40 extend horizontally beyond treads 43, including at least a portion of axle supports 57. This configuration may improve the ability of rover 40 to enter narrower restrictions within a tile system.

Rover 40 includes two sensors 52, one on front end 41 and the other on rear end 42. In the illustrated embodiment, sensors 52 are visual light cameras. Alternatively, sensors 52 could be a non-visible light sensor such as an infra-red thermal sensor. In yet another embodiment, sensors 52 could be sonar sensors. In yet other embodiments, multiple types of sensors can be integrated together in a single sensor or multiple types of sensors could be mounted on rover 40 at the same time (not illustrated).

The illustrated embodiment of visual light cameras, rover 40 includes a light source 45 and light bezel 46 mounted around sensor 52. Light source 45 may be a light emitting diode (LED) or other light source as desired. Light bezel 46 channels light emitted by light source 45 so that the emitted light illuminates the area where sensor 52 can record images to view interal features and materials within a tile.

Figure 17:
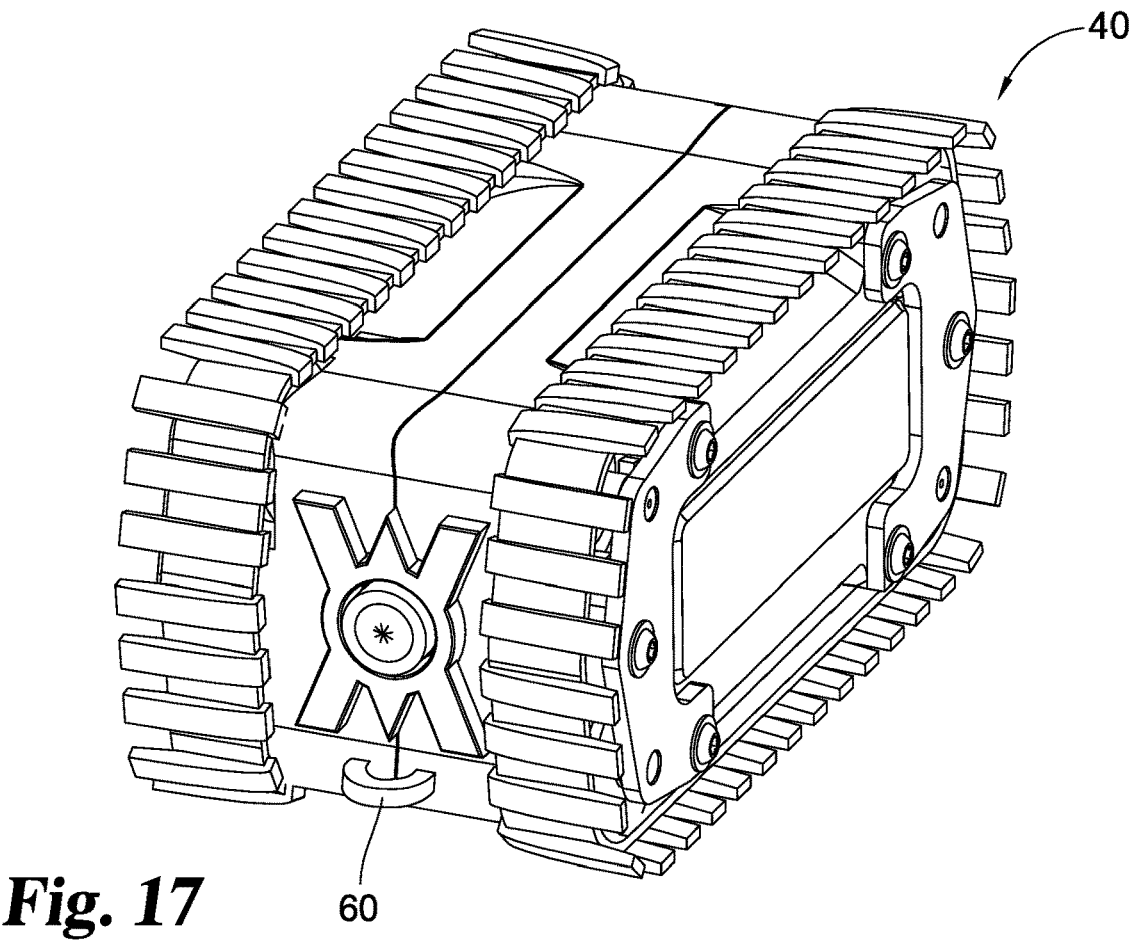
FIG. 17 is a perspective view of a second alternative embodiment of the FIG. 9 tile sensing unit with the tracks in the alternative position.
Figure 18:
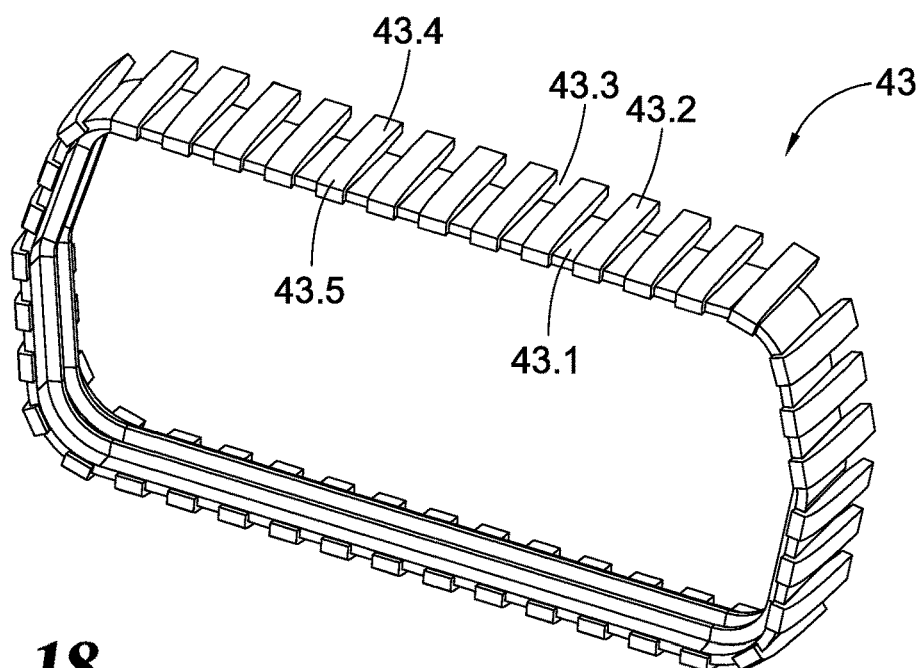
FIG. 18 is a perspective view of a track, a component of the FIG. 8 tile sensing unit.

Referring to FIG. 17, an alternative embodiment of rover 40 including harness 60 is shown. Harness 60 provide a location that a teather can be attached to rover 40. Such a teather can optionally be used to help with recovery of rover 40. A teather could be attached before rover 40 is introduced to a tile, or a teather could be remotely attached to harness 60 if rover 40 becomes stuck in a tile.

Rover 40 can optionally include a passive RFID system 54.1 to help with location of rover 40 in the event of a complete power failure. Rover 40 can also optionally include compass and gyroscope 54.2 to track relative orientation. Compass and gyroscope data can also be associated with information from sensors 52 to assist in the interpretation of data from sensors 52.

Figure 20:
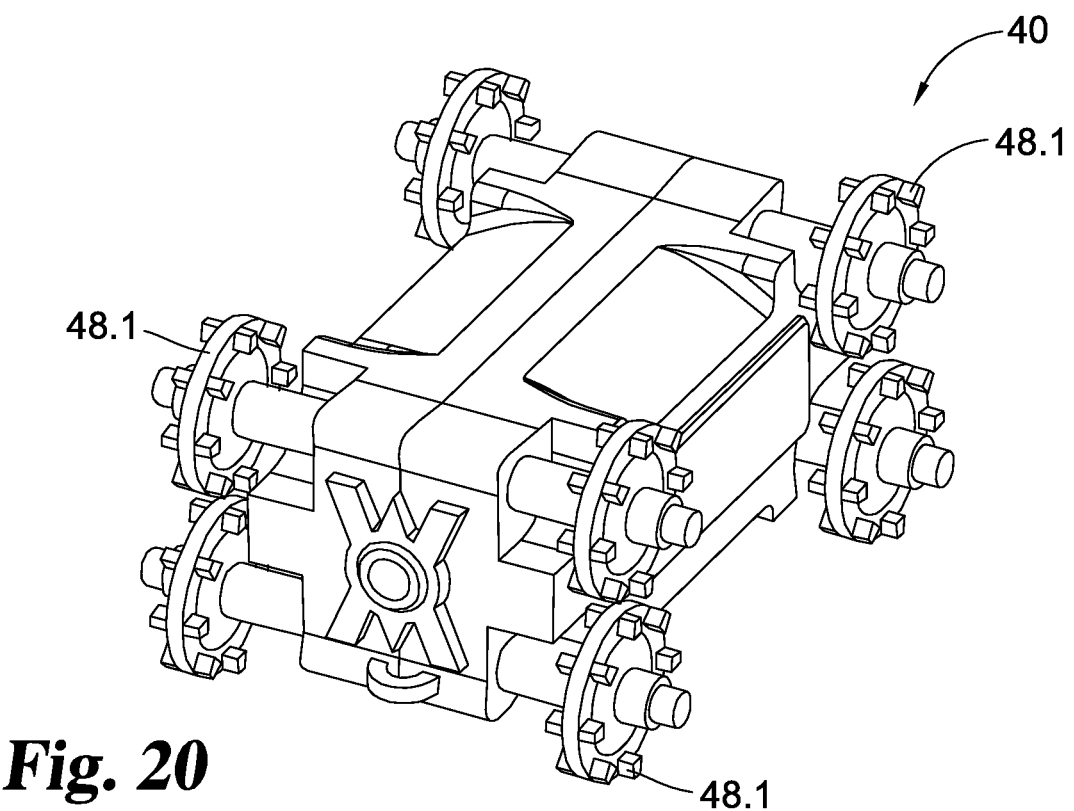
FIG. 20 is a perspective view of a third alternative embodiment of the FIG. 9 tile sensing unit.
Figure 21:
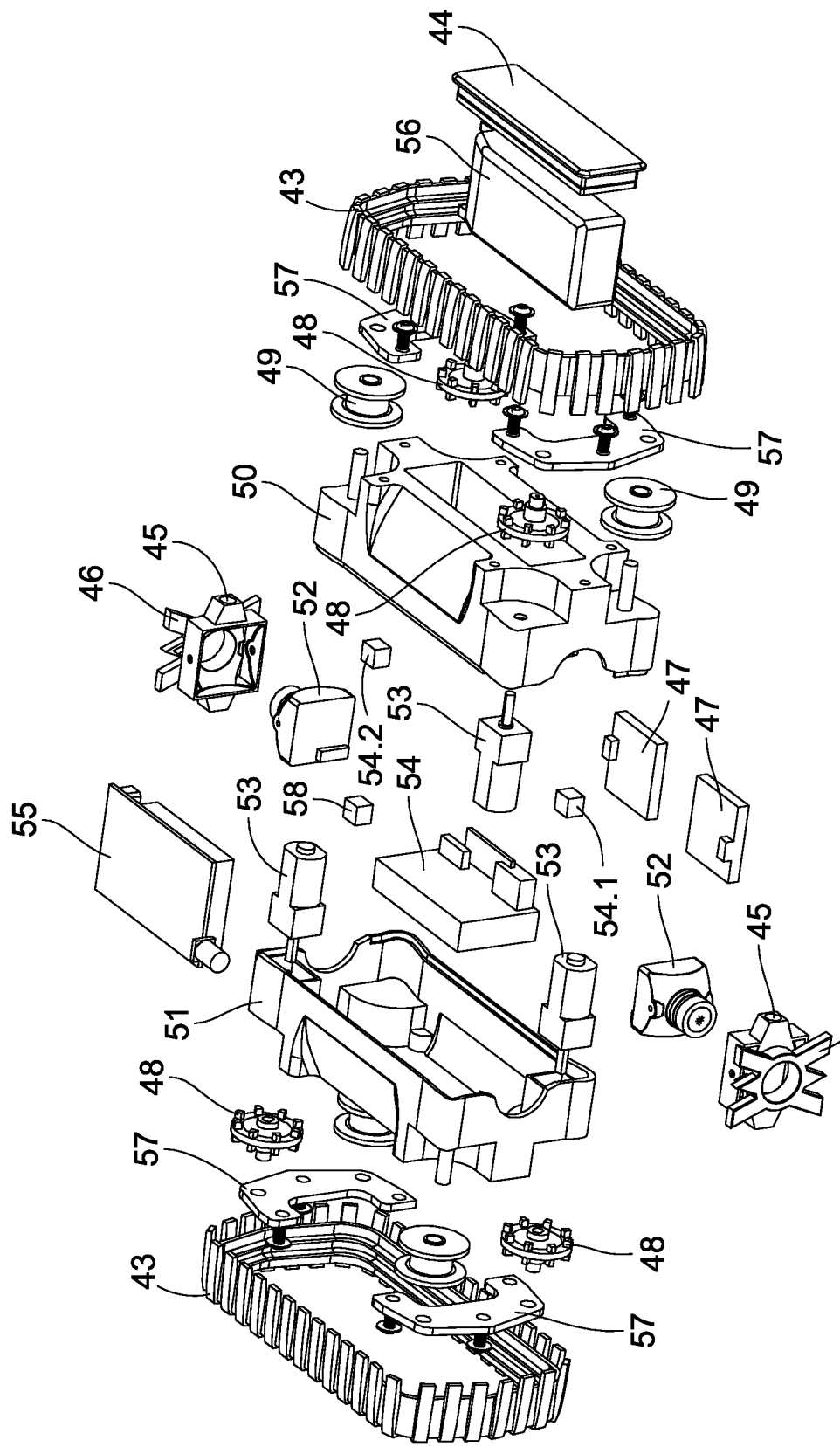
FIG. 21 is an exploded assembly view of the FIG. 9 tile sensing unit.

Referring to FIG. 20, an alternative embodiment of rover 40 is illustrated that replaces tracks 43, drive wheels 48 and idler wheels 49 with wheels 48.1. While not specifically illustrated, each wheel 48.1 is coupled to an individual motor 53. In the illustrated embodiment, wheels 48.1 are configured to engage with correcations in tiles. In other embodiments, any type of wheel could be used.

Figure 22:
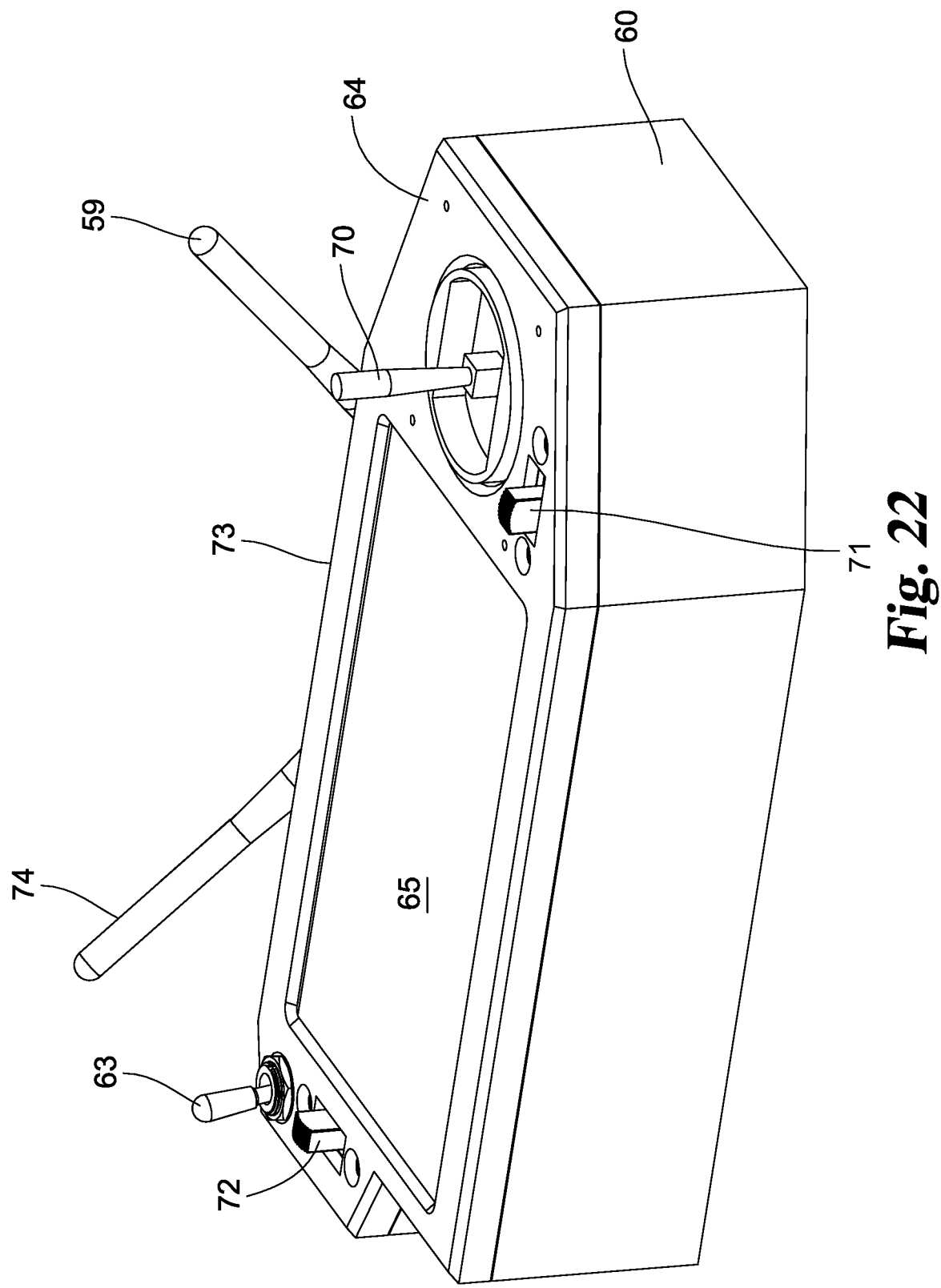
FIG. 22 is a perspective view of an alternative embodiment of a remote control.
Figure 23:
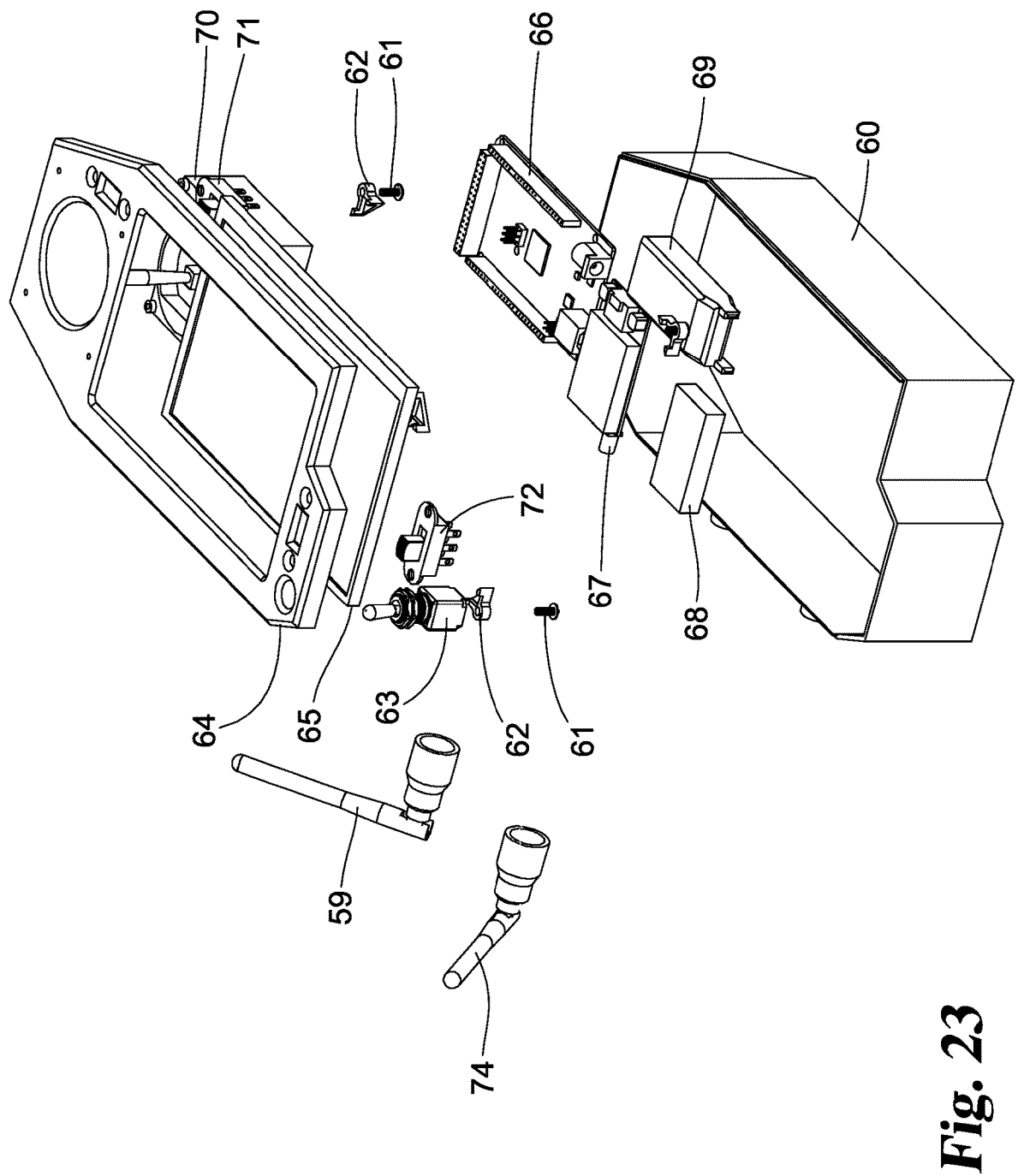
FIG. 23 is an exploded assembly view of the FIG. 22 remote control.
Figure 24:
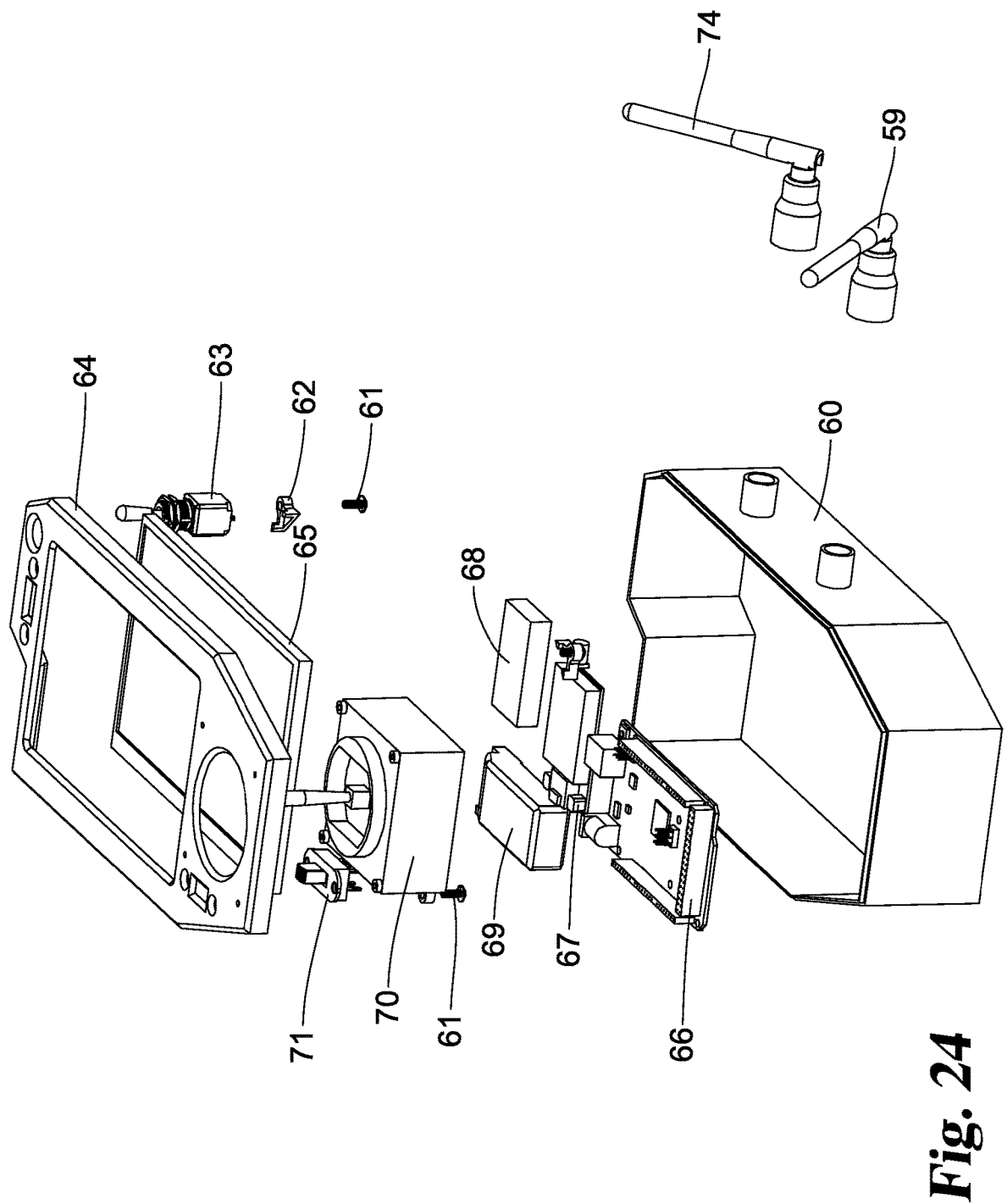
FIG. 24 is an exploded assembly view of the FIG. 22 remote control.

Console 73 is comprised of a rugged lightweight material which is nonconductive and UV resistant. Shown in overview in FIG. 22 and in detail in FIGS. 23 and 24 the console is the user controller and data display for the rover in the remote sensing system. Screen 65 is retained by the combination of retention pieces 62 and screws 61 at each corner. Different embodiments are possible for the retention of components. Console 73 may include an appropriate level of water proofing to withstand the environments in which it is intended to operate. Console microprocessor 66 is configured to measure signal strength of the incoming signals to determine the relative position of the rover unit in the piping or tile system. The console is powered on by switch 71, and total system power is provided by the battery 69.

The console power is controlled by switch 71. The direction of the rover is controlled by joystick 70, processed for the transmission by microprocessor 66. The control transmitter 68 is bound specifically to an individual rover 40 so that multiple inspection tools may be operated within the same vicinity. The control signal is transmitted by antenna 59 and received by the rover through receiver 54. The control signals are also interpreted through receiver 54 and sent out to various components in rover 40. The motion signals are conversed into drive voltages and currents by electronic speed controller (ESC) 47, which drives motors 53. Joystick 70 can generate a variable signal to the rover control receiver 54, resulting in various travel speeds for the rover in both the forward and backward direction. Left and right directions are also controlled by joystick 70. A left motion on the joystick 70 results in a reverse signal sent to the motors 53 on the left of the rover (body 50) and a forward signal sent to the motors 53 on the right of the rover (body 51). A right motion on joystick 70 is the inverse to the process described above.

The sensing feedback system begins with screen 65, which will display the sensor information from rover 40. A video signal is received by the video receiver 67 through the antenna 74 from the rover video transmitter 55. The rover includes two sensors 52, one on the front and rear of the rover. Camera switcher module 58 is controlled by the camera control switch 72 on the console 73. The camera switcher module 58 allows for the user to select between the front 52 and rear sensor 52. The microprocessor 66 in the console is capable of recording a video signal or any of the signals received from rover 40. The record switch 63 sends a momentary signal to the microprocessor 66 to initiate or end recording of the sensor signal received from the video receiver 67. The camera switching could be automated by the direction the rover is traveling but there are use cases where is it advantageous to travel backwards while still viewing signal from the front camera 52. In any event, that user can use views displayed on the screen from sensors 52 while controlling the rover 40 using joystick 70.

Microprocessor 66 can optionally include a power management system that tracks battery power and distance traveled. When it is determined that power is nearing the required power to return to the starting point, notice of low power can be displayed on screen 65. An estimated battery time remaining could also be displayed. For example, as shown in FIG. 28, controller 73 can display battery charge 65.1, distance traveled 65.2 and estimated return time 65.3. In addition, microprocessor 66 and optionally be configured to instruct rover 40 to emit a signal to add in locating rover 40 in the event that there is insufficient power to return and/or rover 40 is stuck. Furthermore, microprocessor 66 can optionally limit input to motors 13 to optimize energy performance of motors 13 to optimize the distance traveled under low power conditions.

Microprocessor 66 can also be configured to associate location data with a map to display a location of rover 40 and the point of entry of rover 40 in a tile.

Figure 25:
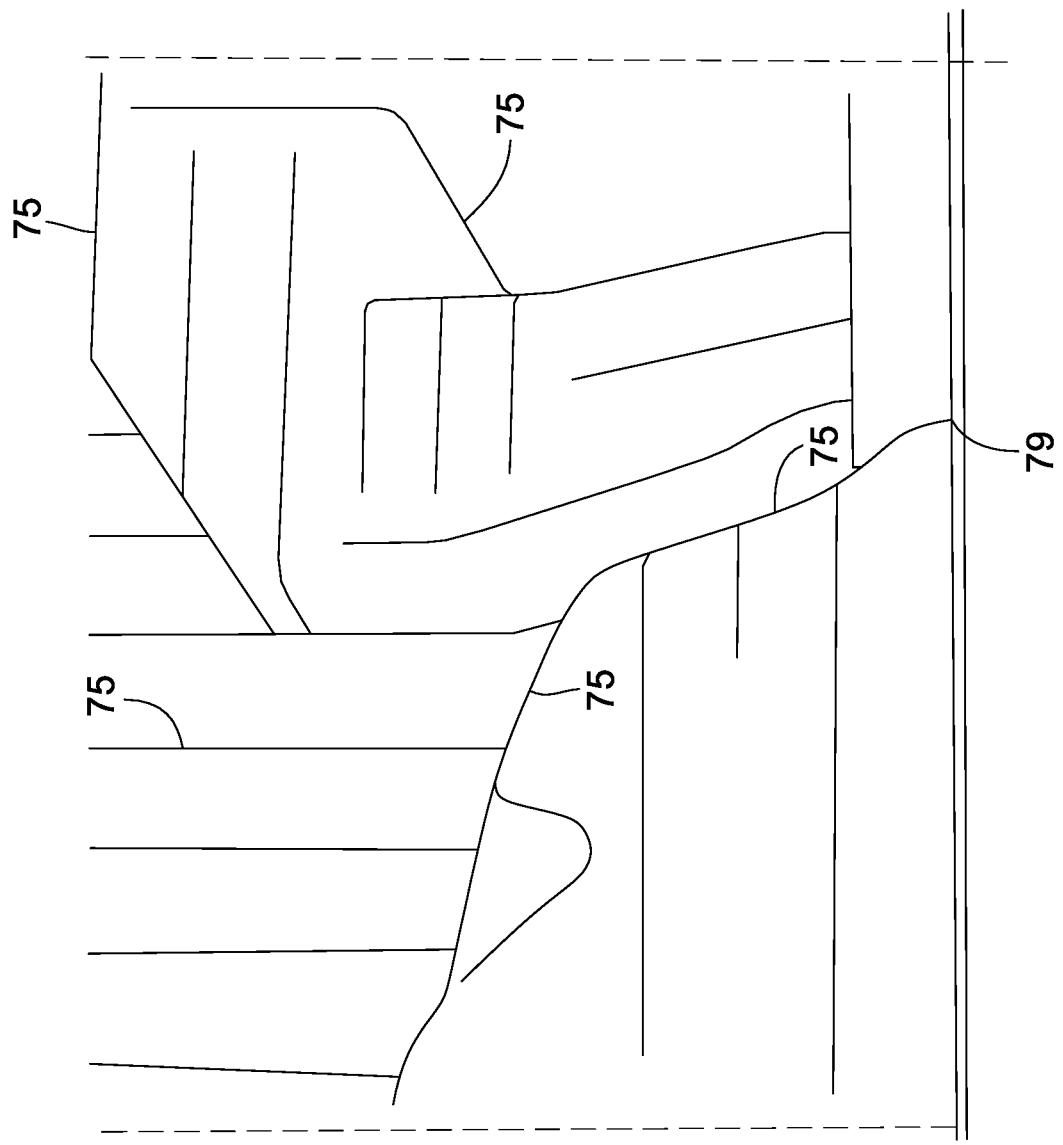
FIG. 25 is a map of an exemplary system of drainage tiles

FIG. 25 illustrates an example layout of tiles 75 providing drainage for the illustrated field though drain 79. Rover 40 can enter the layout though drain 79. Individual portions of a tile 75 can also be exposed and opened to provide access for rover 40.

Figure 26:
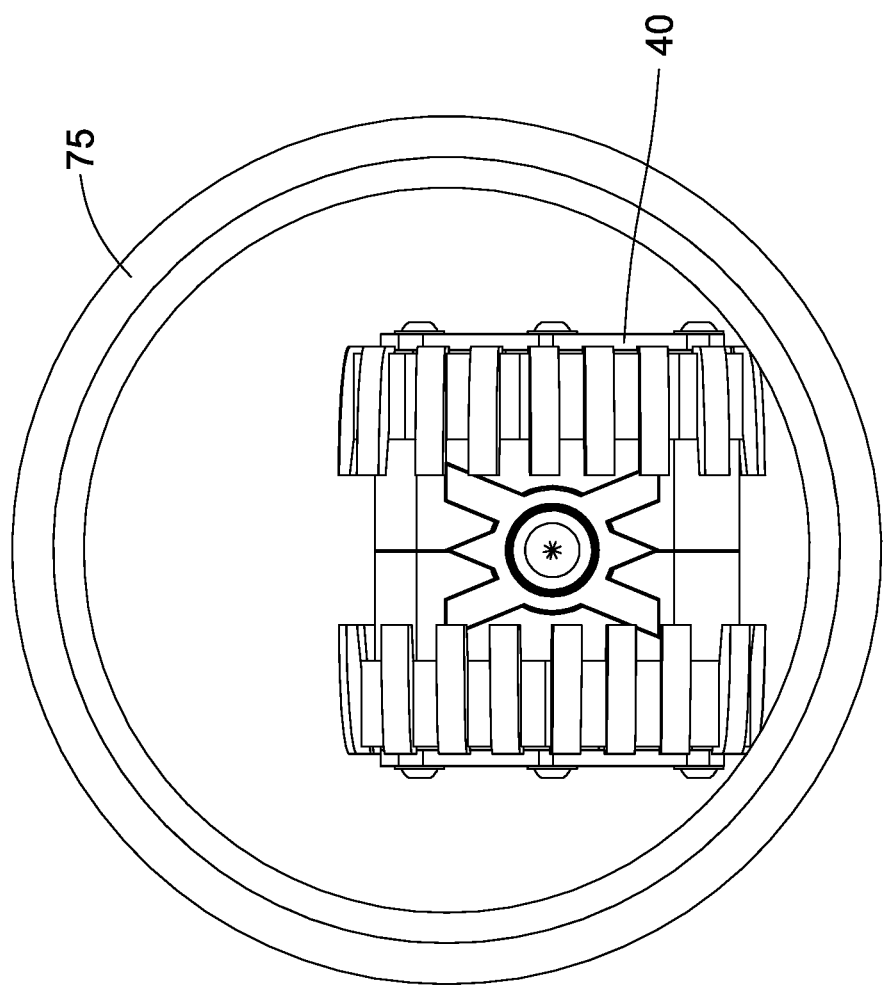
FIG. 26 is a scale front view of the FIG. 9 rover inside an exemplary drainage tile.

FIG. 26 illustrates the relative size of rover 40 unit in a 4" corrugated drain tile 75. (Note that tile 75 is often compressed into an oval shape when buried underground.) For reference and scaling purposes, rover 40 shown in FIGS. 9-12 and 26 is 60 mm wide, 67 mm tall and 122 mm long FIGS. 9-21 and 26 are drawn to scale.

Figure 27:
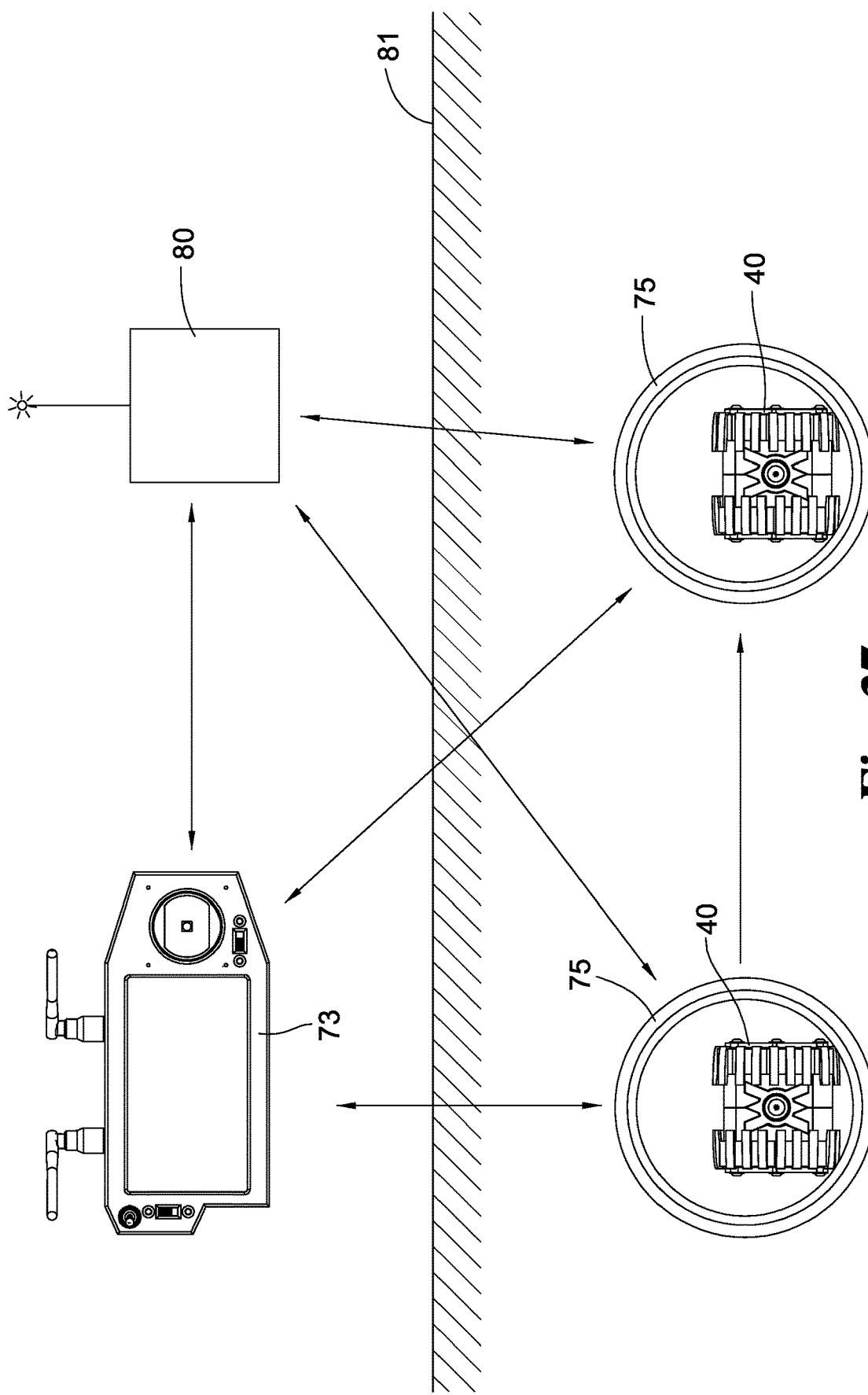
FIG. 27 is a schematic diagram showing communications between the remote control, a substation, and the rover.

FIG. 27 illustrates examples of communications between rover 40 and console 73 through earth 81. Communication can occur directly between rover 40 and console 73 or via an intermediary substation 80 configured to relay communications. Rover 40 can optionally be configured to also act as a substation to relay communication with additional rovers 40 located more remotely from console 73. Rover 40, console 73 and substation 80 each use P polarized antennas which Applicant has identified provide better transmission through earth compared to S polarized antennas.

While the claimed subject matter has been illustrated and described in detail in the drawings and foregoing description, the same is to be considered as illustrative and not restrictive in character. All changes and modifications that come within the spirit of the disclosure are desired to be protected by the claims.

We claim:

1. A remote inspection system for inspecting piping, the system comprising:
    a vehicle configured to move through pipe;
    a lighting system mounted on the vehicle;
    a sensor mounted on the vehicle;
    a communication system on the vehicle;
    a processor configured to assess an effective drainage coefficient of the inspected piping based on data gathered from the sensor.

2. The remote inspection system of claim 1, further comprising a remote control.

3. The remote inspection system of claim 2, wherein the processor is part of the remote control.

4. The remote inspection system of claim 1, wherein the vehicle further comprises a means of location selected from the group consisting of full tracks, halftracks and multi wheel assemblies.

5. The remote inspection system of claim 4, wherein the means of location are interchangeable.

6. The remote inspection system of claim 1, wherein the vehicle is configured to accept different sensor or tool attachments.

7. The remote inspection system of claim 1, further comprising a substation configured to relay signals from the vehicle.

8. The remote inspection system of claim 1, further comprising:
    a controller;
    wherein the controller communicates with, controls, and receives data from the vehicle.

9. The remote inspection system of claim 8, wherein the vehicle comprises tracks that are configured to move the vehicle within drainage tiles.

10. The remote inspection system of claim 9, wherein the tracks extend above and below the vehicle such that the highest and lowest points on the vehicle are the tracks.

11. The remote inspection system of claim 10, wherein the tracks extend beyond the sides of the vehicle such that the widest points on the left and right of the vehicle are the tracks.

12. The remote inspection system of claim 8, wherein the sensor comprises a camera.

13. The remote inspection system of claim 8, further comprising a harness configured to receive a tether.

14. The remote inspection system of claim 8, further comprising a first camera on a front end of the vehicle and a second camera on a rear end of the vehicle.

15. The remote inspection system of claim 14, further comprising a first light source on the front end of the vehicle and a second light source on the rear end of the vehicle.

16. The remote inspection system of claim 8, wherein the vehicle is configured to traverse buried 4-inch tile.

17. The remote inspection system of claim 16, wherein the vehicle is less than 3 inches wide and is less than 3 inches tall.

* * * * *